United States Patent
Haapanen et al.

(10) Patent No.: US 9,516,473 B1
(45) Date of Patent: Dec. 6, 2016

(54) DEVICE MANAGEMENT BASED ON TRACKING PATH TAKEN BY USER

(71) Applicants: Tom Haapanen, Kitchener (CA); Matt Cecile, Waterloo (CA)

(72) Inventors: Tom Haapanen, Kitchener (CA); Matt Cecile, Waterloo (CA)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/090,124

(22) Filed: Apr. 4, 2016

(51) Int. Cl.
*H04W 24/00* (2009.01)
*H04W 4/02* (2009.01)
*H04W 4/00* (2009.01)
*H04W 4/04* (2009.01)

(52) U.S. Cl.
CPC ............ *H04W 4/028* (2013.01); *H04W 4/008* (2013.01); *H04W 4/043* (2013.01)

(58) Field of Classification Search
CPC ....... H04W 4/028; H04W 4/008; H04W 4/043
USPC ...................................................... 455/456.1
See application file for complete search history.

(56) References Cited

U.S. PATENT DOCUMENTS

| | | | |
|---|---|---|---|
| 7,197,489 B1* | 3/2007 | Gauvin | H04L 41/0233 |
| 8,891,106 B1 | 11/2014 | Haapanen | |
| 9,122,433 B2* | 9/2015 | Haapanen | G06F 3/1268 |
| 9,130,838 B2* | 9/2015 | Anderson | H04L 43/0817 |
| 9,298,574 B2* | 3/2016 | Tanaka | G06F 11/3013 |
| 2002/0046253 A1* | 4/2002 | Uchida | H04L 63/02 709/217 |
| 2003/0033395 A1* | 2/2003 | Sato | G06F 3/1204 709/223 |
| 2003/0151766 A1* | 8/2003 | Clough | G06F 3/1222 358/1.15 |
| 2004/0181690 A1* | 9/2004 | Rothermel | H04L 29/06 726/1 |
| 2005/0028006 A1* | 2/2005 | Leser | H04L 9/08 726/26 |
| 2008/0051076 A1* | 2/2008 | O'Shaughnessy | G06F 21/305 455/419 |
| 2010/0106958 A1* | 4/2010 | Watanabe | G06F 21/552 713/100 |
| 2012/0102161 A1* | 4/2012 | Deprun | H04L 12/12 709/220 |
| 2012/0265865 A1 | 10/2012 | Tanaka | |
| 2012/0266073 A1 | 10/2012 | Tanaka | |
| 2014/0222980 A1 | 8/2014 | Hagiwara | |
| 2014/0223325 A1 | 8/2014 | Melendez | |

OTHER PUBLICATIONS

U.S. Appl. No. 14/735,251, Tom Haapanen, Qinlei Fan, Offline Mobile Capture, Pending.
U.S. Appl. No. 14/926,978, Tom Haapanen, Matt Cecile, System, Apparatus and Method for Secure Operation of Image Forming Device, Pending.
U.S. Appl. No. 14/934,093, Tom Haapanen, Matt Cecile, System, Apparatus and Method for Tracking and Managing Devices, Pending.

(Continued)

*Primary Examiner* — Marceau Milord
(74) *Attorney, Agent, or Firm* — Cooper & Dunham LLP

(57) ABSTRACT

A path tracking application (or other mobile application) hosted on a host terminal is configured to track a path taken by the terminal, by communicating with output devices and beacon devices along the path.

19 Claims, 20 Drawing Sheets

(56) References Cited

OTHER PUBLICATIONS

U.S. Appl. No. 15/015,619, Tom Haapanen, Matt Cecile, System, Apparatus and Method for Easy Access to Casual or Guest Printing, Pending.

U.S. Appl. No. 15/088,901, Tom Haapanen, System, Apparatus and Method Configured to Detect, Analyze and/or Report Impact to Output Device, Pending.

U.S. Appl. No. 14/735,251 of Tom Haapanen et al., filed Jun. 10, 2015.

U.S. Appl. No. 14/926,978 of Tom Haapanen et al., filed Oct. 29, 2015.

U.S. Appl. No. 14/934,093 of Tom Haapanen et al., filed Nov. 5, 2015.

U.S. Appl. No. 15/015,619 of Tom Haapanen et al., filed Feb. 4, 2016.

U.S. Appl. No. 15/088,901 of Tom Haapanen, filed Apr. 1, 2016.

* cited by examiner

Path Detail Records

| Path # | User Device | Output/ Beacon Device | Date & Time | Time Spent Within Range | Max Signal Strength | GPS Coordinates |
|---|---|---|---|---|---|---|
| 1 | WTRET533 | WTY6544 | 01/01/2016 12:23:12.067 | 1.34s | -28db | 43.63871944444445, -116.2413513485235 |
| 1 | WTRET533 | WTY6434 | 01/01/2016 12:24:32.233 | 2.32s | -58db | 43.63871944444445, -116.2442348535235 |
| 1 | WTRET533 | WTY6222 | 01/01/2016 12:23:54.123 | 0.65s | -98db | 43.63871944424445, -116.2413513485235 |
| 2 | WTRET533 | WTY6544 | 01/01/2016 14:05:34.434 | 12.45s | -34db | 43.63871944444445, -116.2413513485235 |
| 2 | WTRET533 | WTY1111 | 01/01/2016 14:06:14.423 | 0.76s | -68db | 43.63878678884445, -116.2413513485235 |
| 2 | WTRET533 | WTY8979 | 01/01/2016 14:06:56.787 | 1.23s | -72db | 43.63154525252445, -116.2413988889235 |

Fig. 6A

User Path Record

| Path # | Inactive Period Prior | Output Device / Beacon | Path Start Time | Target Activity | Job Attributes |
|---|---|---|---|---|---|
| 1 | 345.54s | WTY6544 | 01/01/2016 12:20:22.455 | PRINT | Color, Duplex, LTR |
| 2 | 14.23s | WTY6431 | 01/01/2016 14:05:45.454 | COPY | BW, Single-sided, LGL |
| 3 | 454.12s | WTY6544 | 01/01/2016 16:23:12.067 | SCAN | Duplex, Color, LTR |

Fig. 6B

DEVICE MANAGEMENT BASED ON TRACKING PATH TAKEN BY USER

TECHNICAL FIELD

This disclosure relates to systems, apparatuses, applications, methodologies and other tools to track a path taken by a host terminal, and more specifically, such tools including provisions to communicate with output devices and beacon devices along the path.

BACKGROUND

In the current information age, information technology (IT) tools play a significant role in our daily activities, and there are often discussions of the desirableness of a paperless society. However, notwithstanding such discussions, there remains a need by users of computers and other information terminals (that is, any of the various conventional devices which may have a need to print on demand, such as personal computers, notebook computers, workstations, other types of computers, kiosks, PDAs, other information appliances, etc.) for printing (as well as other output) functionalities. Therefore, output devices having printing or plotting functionality, such as printers, copiers, multi-function peripheral (MFP) devices, etc., continue to play a significant role at home, at work and even elsewhere.

As output devices and other IT assets continue to proliferate, device management tools are extensively used in, for example, an office environment in order to manage a fleet of devices (such as multi-function devices, printers, etc.) and other IT assets. For example, one of the challenges in planning the placement of output devices in an office environment often is determining the optimal location (e.g., so as to optimize use) of the devices. While it is possible to optimize device location based on a floorplan and distances to the desks of employees, there is no easy solution to analyze traffic patterns and determine which locations are most convenient, and which ones might be ignored even if they are actually convenient.

SUMMARY

Various tools (for example, a system, an apparatus, application software, a method, etc.) can be provided to facilitate improvements to device management, by tracking the paths taken by users in, for example, an office environment. Such path details information or record can be analyzed to determine improvements to locations, capabilities and number of output devices in the office, such as to reduce travel time or average waiting time or to optimize capital expenditure and operating costs, etc.

In an embodiment of this disclosure, a path tracking application (or other mobile application) is configured to track a path taken by a host terminal, by communicating with output devices and beacon devices along the path. Such host terminal typically includes provisions (e.g., GPS receiver, accelerometer, triangulation of cells or other transmitters of reference positions, etc.) to provide position information regarding then-current position of the host terminal, and date-and-time provisions to provide time information regarding then-current date and time at the host terminal. Such provisions enable the application to determine when the host terminal has been stationary for (at least) a predetermined stationary period of time, and detect movement of the host terminal after such stationary period of time. Upon such detection (of start of a path), the application commence recordation of a path detail record corresponding to the new path navigated by the host terminal. As the terminal navigates the path, the application communicates by short-range point-to-point communication, such as by Bluetooth, BLE (Bluetooth Low Energy), other similar technology, etc., with the output devices and beacon devices having provisions to conduct short-range point-to-point communication, when the device is within a short-range communication range threshold. Data and information collected by the application during navigation of the path are registered in the path detail record which has an associated path identifier and can include, for each short-range communication session with any output device or beacon device during such path navigation, device identifier of the output device or beacon device, date and time at the host terminal when the short-range communication session commenced, time spent within short-range communication range of the output device or beacon device during the short-range communication session, maximum signal strength of the short-range communication during the short-range communication session, etc.

Such path detail record may be processed along with other path detail records locally during a low processing load period, or may more typically be uploaded to a device management server, when the path tracking application connects to the device management server, and processed by the device management server, for determination of improvements.

The aforementioned and other aspects, features and advantages are discussed infra.

BRIEF DESCRIPTION OF THE DRAWINGS

The aforementioned and other aspects, features and advantages can be more readily understood from the following detailed description with reference to the accompanying drawings wherein:

FIG. 6A shows an example of a path detail record;

FIG. 6B shows an example of a user path record;

DETAILED DESCRIPTION OF EMBODIMENTS

Figure 1:
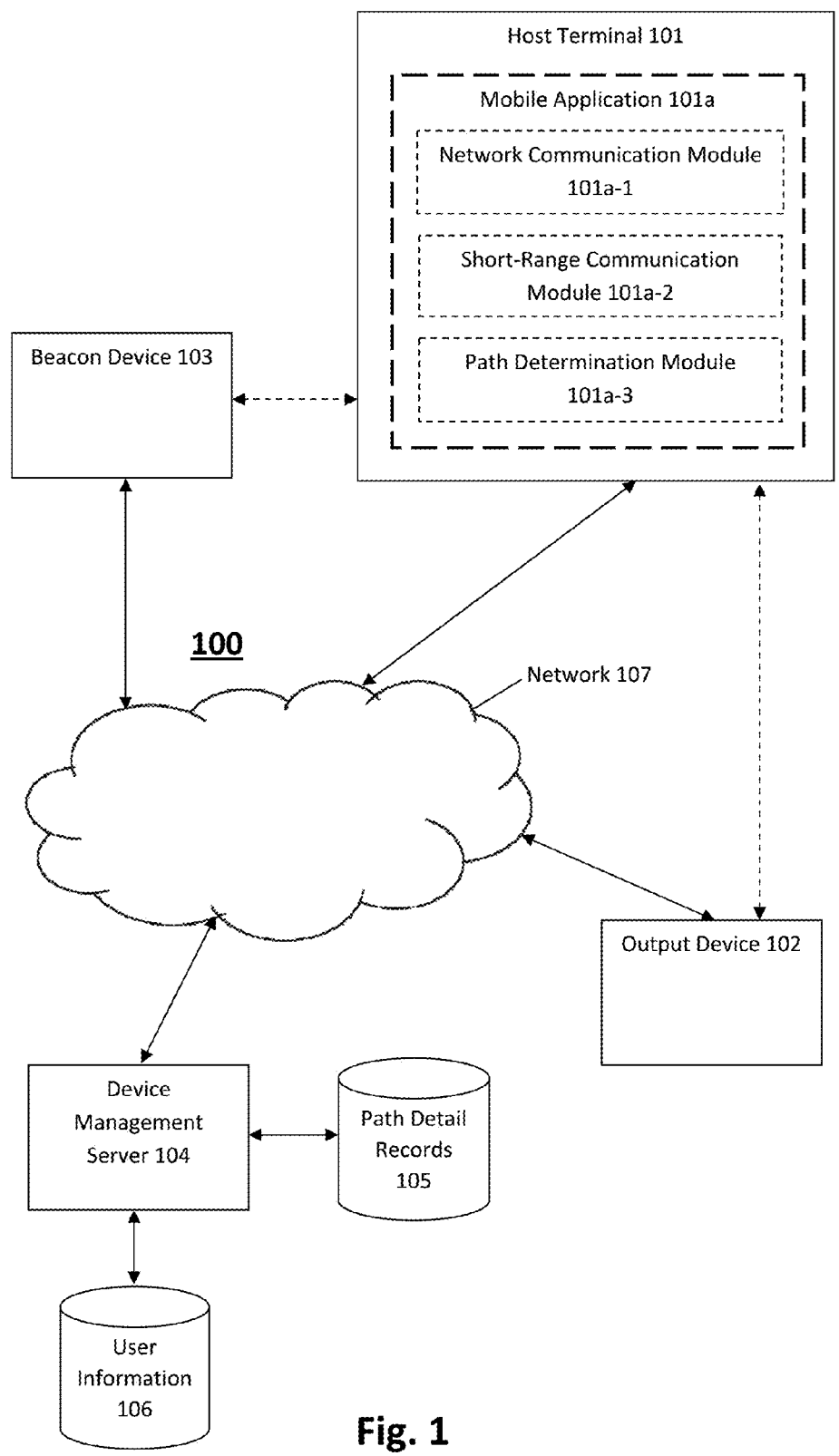
FIG. 1 shows a block diagram of a system that can include various provisions to track a path taken by a host terminal, according to an embodiment of this disclosure.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools to facilitate tracking of a path taken by a host terminal hosting a path tracking application or mobile application are discussed herein. It should be appreciated by those skilled in the art that any one or more of such tools may be embedded in the application and/or in any of various other ways, and thus while various examples are discussed herein, the inventive aspects of this disclosure are not limited to such examples described herein.

Referring now to the drawings, wherein like reference numerals designate identical or corresponding parts throughout the several views, FIG. 1 shows schematically a system 100 that includes a host terminal 101, an output device 102, a beacon device 103, a device management server 104, a path detail records database 105 and a user information database 106. Each of the host terminal 101, the output device 102 and the device management server 104 is configured to connect to a network 107.

The host terminal 101 can be any computing device, including but not limited to a tablet or notebook computer, a PDA (personal digital assistant), a mobile phone or handset, another mobile information terminal, etc., that can communicate with other devices through the network 107.

A mobile application (e.g., path tracking application) 101a may be provided on or to the host terminal 101 to determine and register position and time information associated with present position of the host terminal 101. Such application may be a native program installed on the host terminal 101, or may be provided from an external source as an application and/or as part of a platform, or may be provided as a service (e.g., software as a service, i.e. SaaS).

The path tracking application 101a may include a network communication module 101a-1, a short-range communication module 101a-2 and a path determination module 101a-3.

The network communication module 101a-1 permits the host terminal 101 to communicate, via the network 107 (including a wife network and/or a mobile network), with the device management server 104. In this case, whenever the host terminal 101 connects with the device management server 104, the host terminal 101 may upload information stored in a persistent local storage on the host terminal 101. For example, the network communication module 101a-1 may facilitate the uploading of path detail records (e.g., records of movement taken by the host terminal 101, etc.). In another example, the network communication module 101a-1 may also facilitate the uploading of user information (e.g., information associated with the user of the host terminal 101, etc.) The network communication module 101a-1 may perform wireless communication (e.g., Ethernet, 802.11, etc.) with other devices (e.g., printer, scanner, fax machine, MFP, personal computer, notebook computer, tablet, routers, switches, etc.).

The short-range communication module 101a-2 allows the host terminal 101 to communicate with the output device 102 in a manner that is different from the network communication module 101a-1. The host terminal 101 uses the short-range communication module 101a-2 to communicate with the output device 102 when the output device 102 is within a short-range communication range of the host terminal 101. The short-range communication range is typically shorter than the wireless communication range of the host terminal 101. While the host terminal 101 may communicate via network 107 with the output device 102, and vice versa, the short-range communication module 101a-2 does not commence short-range communication with the output device 102 until the output device 102 is within the short-range communication range of the host terminal 101. Once the host terminal 101 is within short-range communication range threshold of the output device 102, the short-range communication module 101a-2 transmits a request for a device identifier (e.g., MAC address, IP address, registration number, serial number, etc.) corresponding to the output device 102. In response, the output device 102 communicates the device identifier to the short-range communication module 101a-2.

The path determination module 101a-3 detects movements of the host terminal 101, and keeps a record of the path taken by the host terminal 101 during said movements. Such detection commences when the path determination module 101a-3 determines that after a predetermined stationary period of time, the host terminal 101 has started to move. In one example, the determination of whether the host terminal 101 has been stationary for at least a predetermined stationary period of time may be facilitated by the use of (i) an accelerometer disposed within the host terminal 101 and (ii) date and time provisions extracted from an internal clock or application within the host terminal 101. When the host terminal is put into motion, the path determination module 101a-3 begins recording of a new path taken by the host terminal 101 and creates a corresponding path identifier (e.g., a series of numbers and letters, etc.) for this new path. Each section of the new path may be determined when the host terminal 101 detects one or more output devices 102 and/or beacon devices 103 via short-range point-to-point communication.

For example, when the host terminal 101 is within short-range communication of the output device 102 or the beacon device 103, the path determination module 101a-3 may cause the host terminal 101 to communicate with the output device 102 or the beacon device 103 in a short-range communication session, in order to obtain a device identifier (e.g., a series of numbers and letters, etc.) of the output device 102 or the beacon device 103. During this short-range communication session, the path determination module 101a-3 may also (i) extract, from the internal clock or the application on the host terminal 101, date and time that the host terminal 101 began short-range communication with the output device 102 or the beacon device 103, (ii) determine an amount of time that the host terminal 101 has spent communicating in short-range communication with the output device 102 or the beacon device 103, (iii) measure the maximum signal strength of the short-range communication with the output device 102 or the beacon device 103 and (iv) calculate the present position of the host terminal 101 by using the maximum signal strength that was previously measured.

After the path determination module 101a-3 has performed the aforementioned actions (e.g., extract date and time, measure maximum signal strength, calculate present position, etc.) for the output device 102 or the beacon device 103, the path determination module 101a-3 determines whether the new path has ended. In the case that the new path has not yet ended, the path determination module 101a-3 performs the same aforementioned action at every output device 102 or beacon device 103 that the host terminal 101 encounters via short-range communication. As a result, by identifying each output device 102 or beacon device 103 detected by the host terminal 101 via short-range communication as a marker point, a route of the host terminal 101 can be determined by connecting each marker point.

On the other hand, the path determination module 101*a*-3 may determine that the new path has ended. Thus, an endpoint of the new path can be determined by whether the host terminal 101 has been stationary for a predetermined inactive period of time. As stated previously, in one example, the determination of whether the host terminal 101 has been stationary for at least a predetermined inactive period of time may be facilitated by the use of (i) the accelerometer disposed within the host terminal 101 and (ii) the date and time provisions extracted from the internal clock or the application within the host terminal 101.

After the path determination module 101*a*-3 has determined that the new path has ended, the path determination module 101*a*-3 records the new path as a path detail record in a persistent local storage of the host terminal 101. The path detail record includes the path identifier which labels (e.g., by a series of numbers and letters, etc.) the new path taken by the host terminal 101. In addition, the path detail record also includes, for each output device 102 and/or beacon device 103 that the host terminal 101 has detected via short-range communication range, (i) date and time that the host terminal 101 began short-range communication with the output device 102 or the beacon device 103, (ii) the amount of time that the host terminal 101 has spent communicating in short-range communication with the output device 102 or the beacon device 103, (iii) the maximum signal strength of the short-range communication with the output device 102 or the beacon device 103 and (iv) the present position of the host terminal 101 relative to the output device 102 or the beacon device 103 by using the maximum signal strength that was previously measured.

In an exemplary embodiment, the endpoint of the new path may be at one of the output devices 102. Thus, the path determination module 101*a*-3 may associate such output device 102 with the endpoint in the path detail record. In another exemplary embodiment, when the user of the host terminal 101 performs operations (e.g., printing, scanning, copying, faxing, etc.) on the output device 102 at the endpoint, the path determination module 101*a*-3 records the operations performed at the output device 102 in the path detail record.

Once the path detail record has been generated and stored in a persistent local storage of the host terminal 101, the path determination module 101*a*-3 may upload such path detail record to the device management server 104 via the network communication module 101*a*-1. In one exemplary embodiment, the path determination module 101*a*-3 uploads the path detail record to the device management server 104 after the path detail record has been generated. In another exemplary embodiment, the path determination module 101*a*-3 uploads the path detail record to the device management server 104 based on a regular schedule. For example, the host terminal 101 may store one or more path detail records. Thus, at a certain point in time according to the regular schedule, the path determination module 101*a*-3 may upload one or more of the stored path detail records to the device management server 104.

For example, the user of the host terminal 101 may be in a stationary position (e.g., sitting, standing, sleeping, etc.) while performing a task (e.g., working on computer, chatting with coworkers, performing a meeting with clients, etc.) for an indeterminate amount of time (e.g., 5 minutes, 90 minutes, 1 hour, 3 days, etc.). Once the user starts moving with the host terminal 101, for example, inside his pocket or in his hand, the path determination module 101*a*-3 (i) detects such movement of the host terminal 101 and (ii) determines the path that the user is taking. In one example, the user may be walking towards a printer to copy some work documents. Thus user may be pass by several output devices 102 and/or beacon devices 103 on his or her way to the printer.

Whenever, the user passes by one of the output devices 102 and/or beacon devices 103 at a distance that permits the host terminal 101 to perform short-range point-to-point communication with said output devices 102 and/or beacon devices 103, such bypassed device is recorded as a marker point. Such marker point is used to determine the path of the user. In one example, a line connecting consecutive marker points can identify the path of the user. After the user has walked towards the printer and begins to perform operations on the printer, he or she may stationary for a predetermined inactive period of time (e.g., standing). When this occurs, the path determination module 101*a*-3 determines that the path of the user has ended. Thus, the path determination module 101*a*-3 generates a path detail record corresponding to the path taken by the user. Such path detail record also associates the endpoint of the path with the printer utilized by the user. The path detail record further records the operations performed by the user at the printer.

The output device 102 may be, for example, an MFP, a printer, a facsimile machine, a scanner, etc. Further, the terms "printer" and "printer device" are used hereinafter generically to include any output device having a printing or plotting functionality, and include multifunction devices having a copy and/or scanning functionality in addition to the printing or plotting functionality. The output device 102 can also provide the path tracking application 101*a* with an approximate present position of the host terminal 101 when the host terminal 101 is within a short-range communication range of the output device 102. There may be more than one output device 102 dispersed at a certain location. For example, the output device 102 may be disposed in various offices, rooms, hallways, etc. Each of the output device 102 may be associated with a particular location and may be identified by an output device identifier stored in the output device 102. Thus, once the host terminal 101 is within the short-range point-to-point communication range of the output device 102, the path determination module 101*a*-3 may obtain, via the short-range communication module 101*a*-2, the output device identifier from the output device 102. The output device identifier includes information on the position of the corresponding output device 102. As a result, when the host terminal 101 receives the output device identifier, the path determination module 101*a*-3 can determine a relative position of the host terminal 101. For example, the path determination module 101*a*-3 may measuring a maximum signal strength of the short-range communication performed with the output device 102. After determining the maximum signal strength, the path determination module 101*a*-3 may then calculate the relative distance from the output device 102 based on the value of the maximal signal strength (e.g., 100 dB=2 feet).

Each beacon device 103 broadcasts its position via short-range communication. Such beacon device 103 provides the path tracking application 101*a* with an approximate present position of the host terminal 101 when the host terminal 101 is within a short-range communication range of the beacon device 103. There may be more than one beacon device 103 dispersed at a certain location. For example, the beacon devices 103 may be disposed on/in walls, the floors, ceilings, furniture, doors, elevators, offices, rooms, etc. Each of the beacon devices 103 may be associated with a particular location and may be identified by a beacon device identifier stored in the beacon devices 103. Thus, once the host terminal 101 is within the short-range point-to-point communication range of the beacon device 103, the path determination module 101a-3 may obtain, via the short-range communication module 101a-2, the beacon device identifier from the beacon device 103. The beacon device identifier includes information on the position of the corresponding beacon device 103. As a result, when the host terminal 101 receives the beacon device identifier, the path determination module 101a-3 can determine a relative position of the host terminal 101. For example, the path determination module 101a-3 may measuring a maximum signal strength of the short-range communication performed with the beacon device 103. After determining the maximum signal strength, the path determination module 101a-3 may then calculate the relative distance from the beacon device 103 based on the value of the maximal signal strength (e.g., 10 dB=1 feet). In an exemplary embodiment, it is not necessary to have the beacon device 103 be connected to the network 107. The beacon device 103 may simply be on its own and may only communicate with devices that come within the short-range communication range of the beacon device 103

The device management server 104 manages one or more output device 102 and one or more beacon devices 103. For example, the device management server 104 may permit an administrator to monitor device status and/or device properties (e.g., device identifiers, device operations, etc.) associated with each output device 102 or beacon device 103. In addition, the device management server 104 may also maintain one or more databases of information received from the host terminals 101. For example, the device management server 104 may receive path detail record and user information (corresponding to a user of path tracking application 101a on the host terminal 101) that are uploaded from a host terminal 101. When the device management server 104 receives the path detail record and user information, the device management server 104 may register the path detail record in the database 105 and register the user information in the user information database 106.

After the device management server 104 registers the path detail record in the path detail records database 105, the device management server 104 may determine, using the registered path detail record, information regarding the behavior of the user of the host terminal 101 or significant information regarding the output devices 102 and beacon devices 103 that the host terminal 101 has detected. In one example, the device management server 104 may determine that the user associated with the registered path detail record was at a particular output device 102 for an indeterminate amount of time. In this case, such particular output device 102 corresponds to an endpoint of a path associated with the registered path detail record. Thus, the device management server 104 may obtain an activity log associated with the particular output device 102 in order to determine why the user of the host terminal 101 was at the particular output device for an indeterminate period of time. In another example, the device management server 104 may receive multiple path detail records corresponding to one or more paths taken by the user of the host terminal 101. In such case, the device management server 104 determines paths that are most frequently used by the user of the host terminal 101.

In an exemplary embodiment, the device management server 104 may also determine information regarding the output devices 102 and beacon devices 103 that were bypassed by the user of the host terminal 101. For example, the device management server 104 may determine, for each bypassed device, the frequency that such bypassed device is being used by another user when it was bypassed by the user of the host terminal 101. For example, when the user of the host terminal 101 walks pass an output device 102 (that he or she is not intending to use) in a range that permits short-range communication, the path determination module 101a-3 records a timestamp associated with such detected output device 102 into the path detail record. As a result, when the device management server 104 receives the path detail record containing information on one or more devices that have been bypassed, the device management server 104 checks the timestamp of when such bypassed device has been detected and access the operation record of the bypassed device to determine if, at the time indicated by the timestamp, operations were being performed by the bypassed device. In another similar example, the device management server 104 may also use the timestamp in the path detail record to determine whether the bypassed devices was broken or in need of service when such bypassed device was bypassed by the user.

In another exemplary embodiment, the device management server 104 may also determine whether each of the bypassed device can print, scan and/or copy. The device management server 104, by using the information obtained from the bypassed devices, can determine the operations (e.g., print, scan, copy, fax, etc.) that each bypassed device can perform. In yet another exemplary embodiment, the device management server 104 may also determine mean, medium and maximum waiting times for user at an output device 102. The user may be at the output device 102 that he or she is intending to use. However, there may be many other users standing in line in front of the user. Thus, the device management server 104 may determine the amount of time taken from the point the user is waiting at the output device 102 to the point that the user is actually using the output device 102.

In yet another exemplary embodiment, the device management server 104 may determine the frequency at which the user passes by a beacon device 103. The beacon devices 103 may be strategically placed to permit maximum tracking of users in order to form the smoothest and most accurate path. However, some beacon devices 103 may be placed at locations that many users do not pass by or a beacon device 103 may be too close to an output device 102. Further, sometimes output devices 102 are removed from a location or moved to another location. Thus, beacon devices 103 may be needed at such locations that the output devices were initially at. As result, the device management server 104 may need to determine which beacon devices 103 are redundant and location at which beacon devices 103 are needed.

The path detail records database 105 registers path detail records received by the device management server 104 from one or more users. The device management server 104 may access the path detail records database 105 to obtain one or more path detail records for the purpose of performing analysis. Each path detail record registered by the path details records database 105 includes, for each output device 102 and/or beacon device 103 that the host terminal 101 has detected via short-range communication range, (i) date and time that the host terminal 101 began short-range communication with the output device 102 or the beacon device 103, (ii) the amount of time that the host terminal 101 has spent communicating in short-range communication with the output device 102 or the beacon device 103, (iii) the maximum signal strength of the short-range communication with the output device 102 or the beacon device 103 and (iv) the present position of the host terminal 101 relative to the output device 102 or the beacon device 103 by using the maximum signal strength that was previously measured.

The user information database 106 includes information regarding each user of the host terminal 101. For example, the user information database 106 may include information associating the user with a device identifier of the host terminal 101. In addition, the user information may also include properties of the user (e.g., name, title, rank, age, etc.).

The network 107 can be a local area network, a wide area network or any type of network such as an intranet, an extranet (for example, to provide controlled access to external users, for example through the Internet), a private or public cloud network, the Internet, etc., or a combination thereof. In addition, the network 107 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 2:
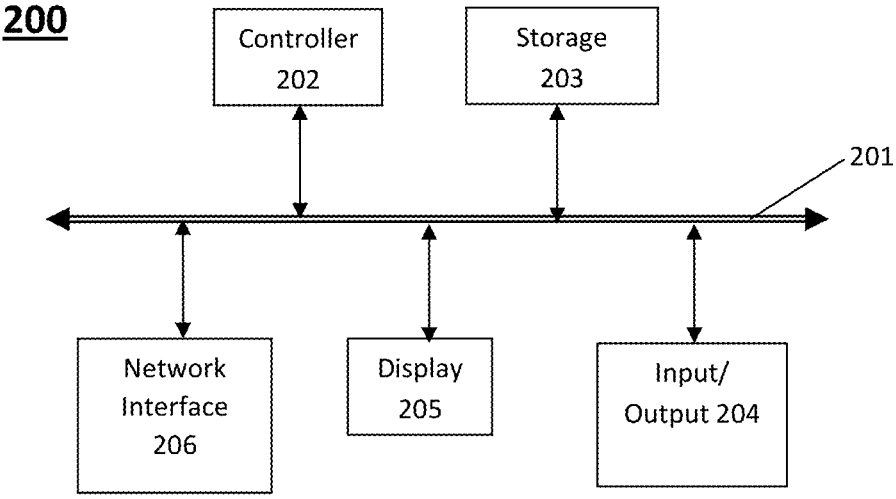
FIG. 2 shows a block diagram of an example of a configuration of a computing device that can be configured by software to operate as a device management server.

FIG. 2 shows an exemplary constitution of a computing device that can be configured (for example, through software) to operate (at least in part) as a device management server (e.g., 102 in FIG. 1). In FIG. 2, apparatus 200 includes a processor (or central processing unit) 202 that communicates with a number of other components, including memory or storage device 203, other input/output (e.g., 10 keyboard, mouse, etc.) 204, display 205 and network interface 206, by way of a system bus 201. The apparatus 200 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as should be appreciated by those skilled in the relevant art. In the management apparatus 200, the processor 202 executes program code instructions that control device operations. The processor 202, memory/storage 203, input/output 204, display 205 and network interface 206 are conventional, and therefore in order to avoid obfuscating the inventive aspects of this disclosure, such conventional aspects are not discussed in detail herein.

The apparatus 200 includes the network interface 206 for communications through a network, such as communications through the network 107. However, it should be appreciated that the subject matter of this disclosure is not limited to such configuration. For example, the apparatus 200 may communicate with user terminals through direct connections and/or through a network to which some components are not connected. As another example, the apparatus 200 does not need to be provided by a server that services terminals, but rather may communicate with the devices on a peer basis, or in another fashion.

The apparatus 200 of the present disclosure is not limited to a server or computer, but can be manifested in any of various devices that can be configured to communicate over a network and/or the Internet.

Figure 3:
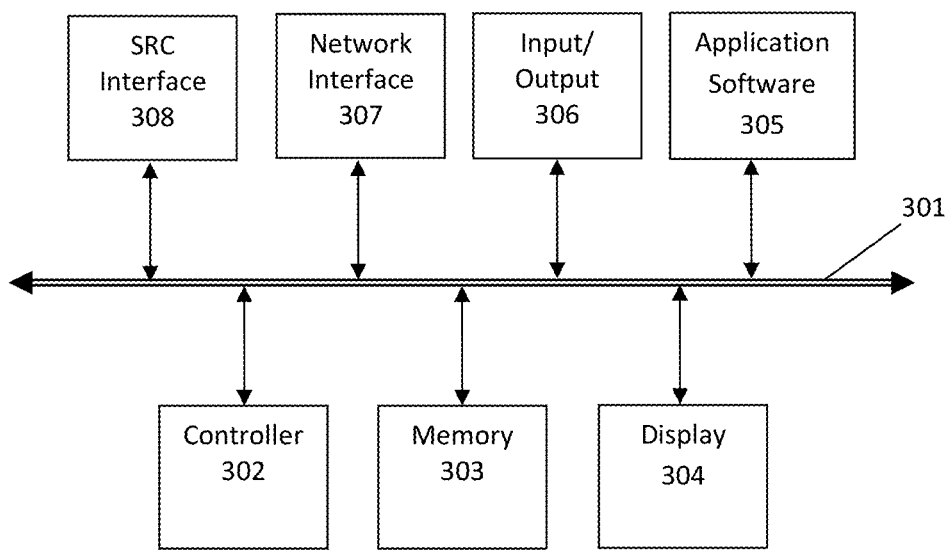
FIG. 3 shows a block diagram of an example of a configuration of a mobile device that can be configured to be a host terminal for a mobile application.

An exemplary constitution of the host terminal 103 of FIG. 1 is shown schematically in FIG. 3. In FIG. 3, terminal 300 includes a processor (or central processing unit) 302 that communicates with various other components, such as memory (and/or other storage device) 303, display 304, application software 305, input/output (such as keyboard, mouse, touchpad, stylus, microphone and/or speaker with voice/speech interface and/or recognition software, etc.) 306, network interface 307 and SRC interface 308, by way of an internal bus 301.

The memory 303 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 307 provides a connection (for example, by way of an Ethernet connection or other network connection which supports any desired network protocol such as, but not limited to TCP/IP, IPX, IPX/SPX, NetBEUI, etc.) to the network to which the computer 300 is connected (e.g., network 107 of FIG. 1).

The SRC interface 308 can be a combination of one or more hardware provisions (e.g., radio antenna) and system software components [e.g., a Bluetooth subsystem, an NFC (near field communication) subsystem, an infrared communication subsystem, etc.] that enables the terminal 300 to conduct direct, peer-to-peer, point-to-point communication with another device having complementary SRC provisions.

Additional aspects or components of the computer 300 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 4:
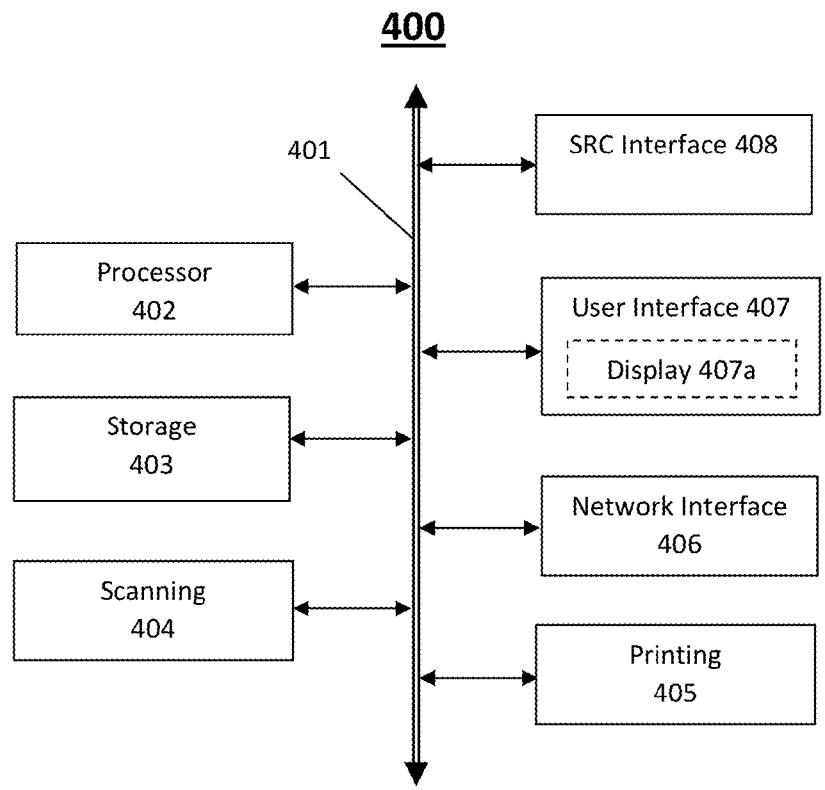
FIG. 4 shows a block diagram of an example of a configuration of a multi-function output device.

FIG. 4 shows a schematic diagram of a configuration of an output device as an MFP (multi-function printer or multi-function peripheral) device. The output device 400 shown in FIG. 4 includes a controller 402, and various elements connected to the controller 402 by an internal bus 401. The controller 402 controls and monitors operations of the output device 400. The elements connected to the controller 402 include storage 403 (for example, random access memory, read-only memory, hard disk drive, portable storage media drive such as for optical discs, magnetic discs, magneto optical discs, etc., semiconductor memory cards, combinations of storage media, etc.), scanning 404, printing 405, a network interface (I/F) 406, a user interface 407 and an SRC interface 408.

Storage 403 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 403 and executed by the controller 402 to carry out the instructions. Such instructions can include instructions for performing specified functions (such as printing, scanning, faxing, copying, e-mailing, etc.) of the output device 400, to enable the output device 400 to interact with a terminal, as well as perhaps other external devices, through the network interface 407, and interactions with users through the user interface 407.

The network interface 406 is utilized by the output device 400 to communicate via a network with other network-connected devices such as a terminal, a server and receive data requests, print (or other) jobs, user interfaces, and etc.

The user interface 407 includes one or more electronic visual displays that display, under control of controller 402, information allowing the user of the output device 400 to interact with the output device 400. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the output device 400, so as to allow the operator to interact conveniently with services provided on the output device 400, or with the output device 400 serving as terminal for accessing electronic data or other content through the network. User interfaces or other contents received through the network via the network interface 406 can be displayed on the display screen.

The display screen does not need to be integral with, or embedded in, a housing of the output device 400, but may simply be coupled to the output device 400 by either a wire or a wireless connection. The user interface 408 may include keys and/or buttons (such as graphical keys or buttons, or other graphical elements, of a GUI on a touchscreen display 407a) for inputting information or requesting various operations. Alternatively, the user interface 407 and the display screen may be operated by a keyboard, a mouse, a remote control, voice recognition, or eye-movement tracking, or a combination thereof.

Since the output device 400 is typically shared by a number of users, and is typically stationed in a common area, the output device 400 preferably prompts the user to supply login credentials or authentication information, such as user name (or other user or group information), password, access code, etc. The user credentials may be stored for the session and automatically supplied for access to other devices through the network. On the other hand, such other devices may prompt the user to supply other user credentials through the user interface. Other methods of authentication may also be used. For example, the MFD 400 may be equipped with a card reader or one or more biometrics means (such as comparing fingerprints, palm prints, voice or speech, retinas or irises, facial expressions or features, signature, etc.). The MFD 400 may communicate the user credentials, provided in the manners discussed above, to other devices or applications connected to the MFD 400 via a network (e.g., the network 107 of FIG. 1) for determining authorization for performing jobs.

The SRC interface 408 can be a combination of hardware provisions (e.g., radio antenna, etc.) and system software components [e.g., a Bluetooth subsystem, an NFC (near field communication) subsystem, an infrared communication subsystem, etc.] that enables the output device 400 to conduct direct, peer-to-peer, point-to-point communication with another device (e.g., terminal 300) having complementary SRC provisions (e.g., SRC 308).

Scanning 404, printing 405, and network interface 406 are otherwise conventional, and therefore, a detailed description of such conventional aspects is omitted in the interest of clarity and brevity. The output device 400 can have any or all of the functions of similar devices conventionally known, such as for scanning, editing and storing images, sending a fax, sending and receiving e-mails with or without attachments, accessing files by FTP or another protocol or facility, surfing the Web, scan-to-folder, scan-to-email, etc. Further, multi-functional devices or multi-function peripheral devices can play a prominent role to convert hardcopy documents to electronic documents.

Figure 5:
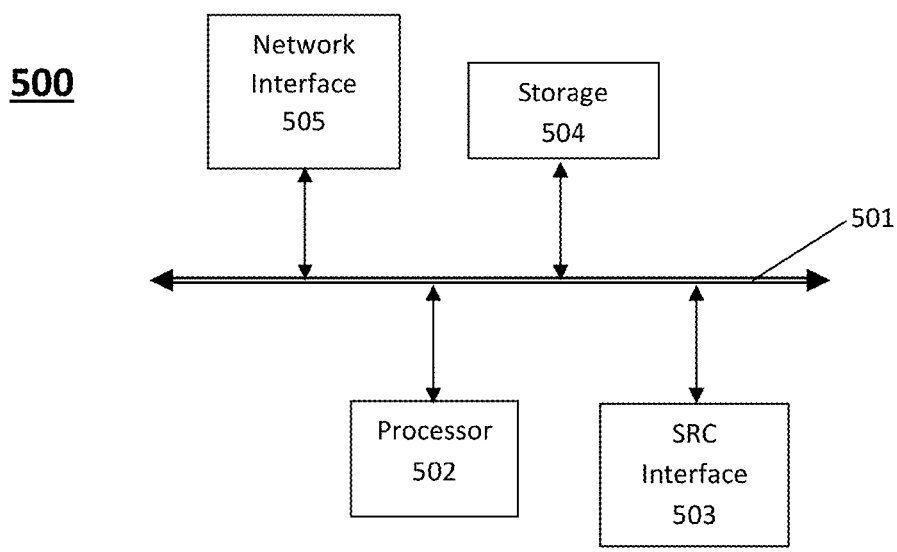
FIG. 5 shows a block diagram of an example of a configuration of a beacon device.

FIG. 5 shows an example of a constitution of a beacon device 500 that can operate as the beacon device 103 of FIG. 1. In FIG. 5, beacon device 500 includes a processor (or central processing unit) 502 that communicates with a number of other components, including (including radio antenna) 503, storage 504 and optionally a network interface 505, by way of an internal bus 501.

The SRC interface 503 can be a combination of hardware provisions (e.g., radio antenna, etc.) and system software components [e.g., a Bluetooth subsystem, an NFC (near field communication) subsystem, an infrared communication subsystem, etc.] that enables the beacon device 500 to conduct direct, peer-to-peer, point-to-point communication with another device (e.g., host terminal 300) having complementary SRC provisions (e.g., SRC 308). The storage 504 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 505 provides a connection (for example, by way of an Ethernet connection or other network connection which supports any desired network protocol such as, but not limited to TCP/IP, IPX, IPX/SPX, or NetBEUI) to a network (e.g. network 107 of FIG. 1).

Additional aspects or components of the router 500 are conventional (unless otherwise discussed herein), and in the interest of clarity and brevity are not discussed in detail herein.

FIG. 6A shows an example of a path detail record which can be stored in a path detail records database 105. Such path detail record includes information regarding every path taken by every user in the system (e.g., 100). For example, the path detail record includes information regarding path identifiers indicating paths taken by users, the beacon/output devices that the user passed by (at short-range communication range), the timestamp (i.e. date and time) in which the user bypassed such device, the maximum signal strength that was received during short-range communication, and the GPS coordinates that correspond to the position of the user when he or she bypassed such device. The position coordinates may be determined from a satellite or may be determined by calculating the maximum signal strength and determining the location of the bypassed device from a device identifier of a bypassed device.

FIG. 6B shows an example of a user path record, which indicates the paths taken by a user and also an output device that is associated with an endpoint of the user's path. For example, the user path record may include the amount of time before the user started moving, the output/beacon device that is at the endpoint of the user's path, the start time of when the user started to move, the operations (e.g., printing, scanning, faxing, copying, etc.) performed at the output device, and job attributes (e.g., color, duplex, A4, stapling, etc.).

Figure 7:
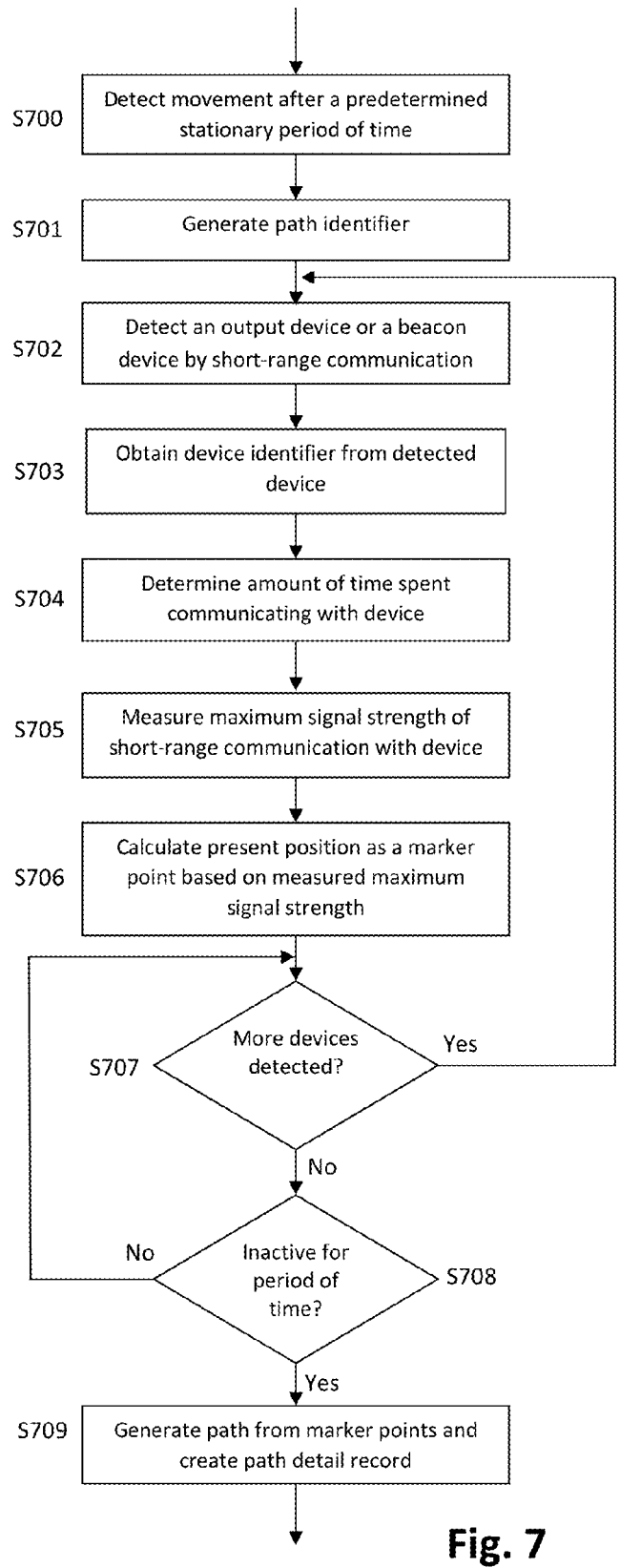
FIG. 7 shows a flow chart of a method that can be performed in the system shown in FIG. 1 (or an equivalent)

FIG. 7 shows a method that can be performed by or with a path tracking application (e.g., 101a) on a host terminal (e.g., 101), according to an exemplary embodiment.

In an exemplary office, there may be an objective to promote workplace efficiency by implementing a system in which the paths of employees are tracked by a system (e.g., 100) to assist in determining a best way to perform output device layout and optimize output device capabilities and operating costs. Such system tracks the movement of the employees via host terminals (e.g., 101) possessed by the employees and output/beacon devices (e.g., 102/103) that are strategically (or randomly) dispersed throughout a location. By gathering information from the paths taken by users throughout a location (e.g., office), a device management server in the system may determine several ways to optimize efficiency (e.g., device placement) in such location.

Figure 8A:
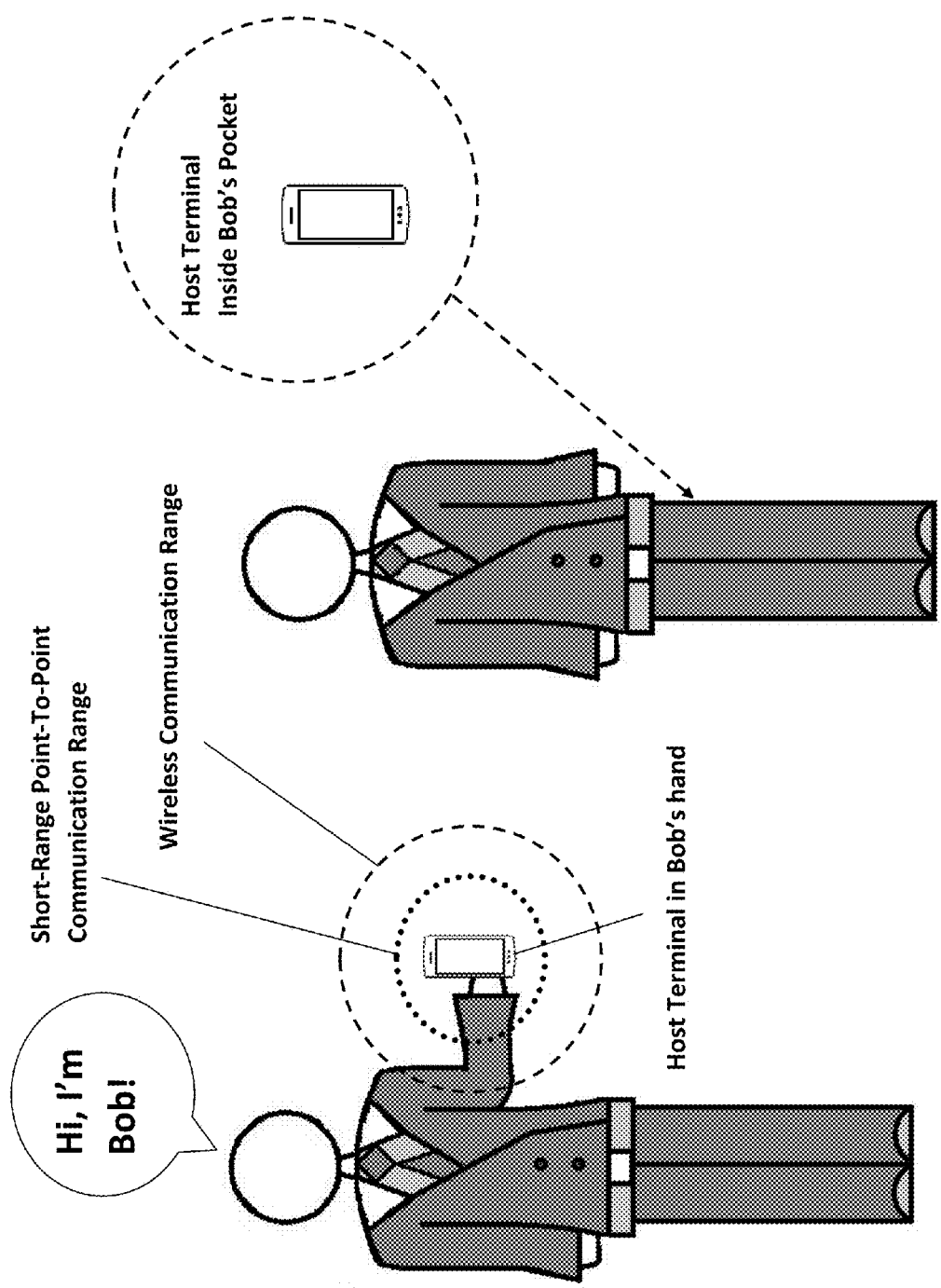
FIGS. 8A-8D show notional examples of interactions between a host terminal and an output device, in any of the systems shown in FIG. 1.

For example, a host terminal is carried by the user in his hand or in his pocket, such as shown in FIG. 8A. The host terminal may include a network interface that allows the host terminal to communicate wirelessly with other devices (e.g., printer, MFP, tablet, smartphone, etc.) via various network protocols (e.g., 802.11, Bluetooth). Such normal wireless communication may happen when a normal wireless communication range of the host terminal overlaps with a normal wireless communication range of another device (e.g., host terminal, output device, etc.). The host terminal can register presence of, and communicate with, an output device when the mobile apparatus is within the operating range of the output device.

On the other hand, the host terminal may also perform short-range point-to-point range communication with another device as well. Like normal wireless communication, the short-range point-to-point communication can be performed wirelessly. However, the short-range point-to-point communication range is smaller than the normal wireless communication range. In order for the mobile device to perform communication with another device using a protocol associated with short-range point-to-point communication, the host terminal and the other device may need to be physically in a closer proximity than when normal wireless communication is used. Thus, even if the other device is within the normal wireless communication range of the host terminal, the mobile device does not communicate with the other device, and instead waits for the other device to be in the short-range communication range of the mobile apparatus or vice versa.

Figure 8B:
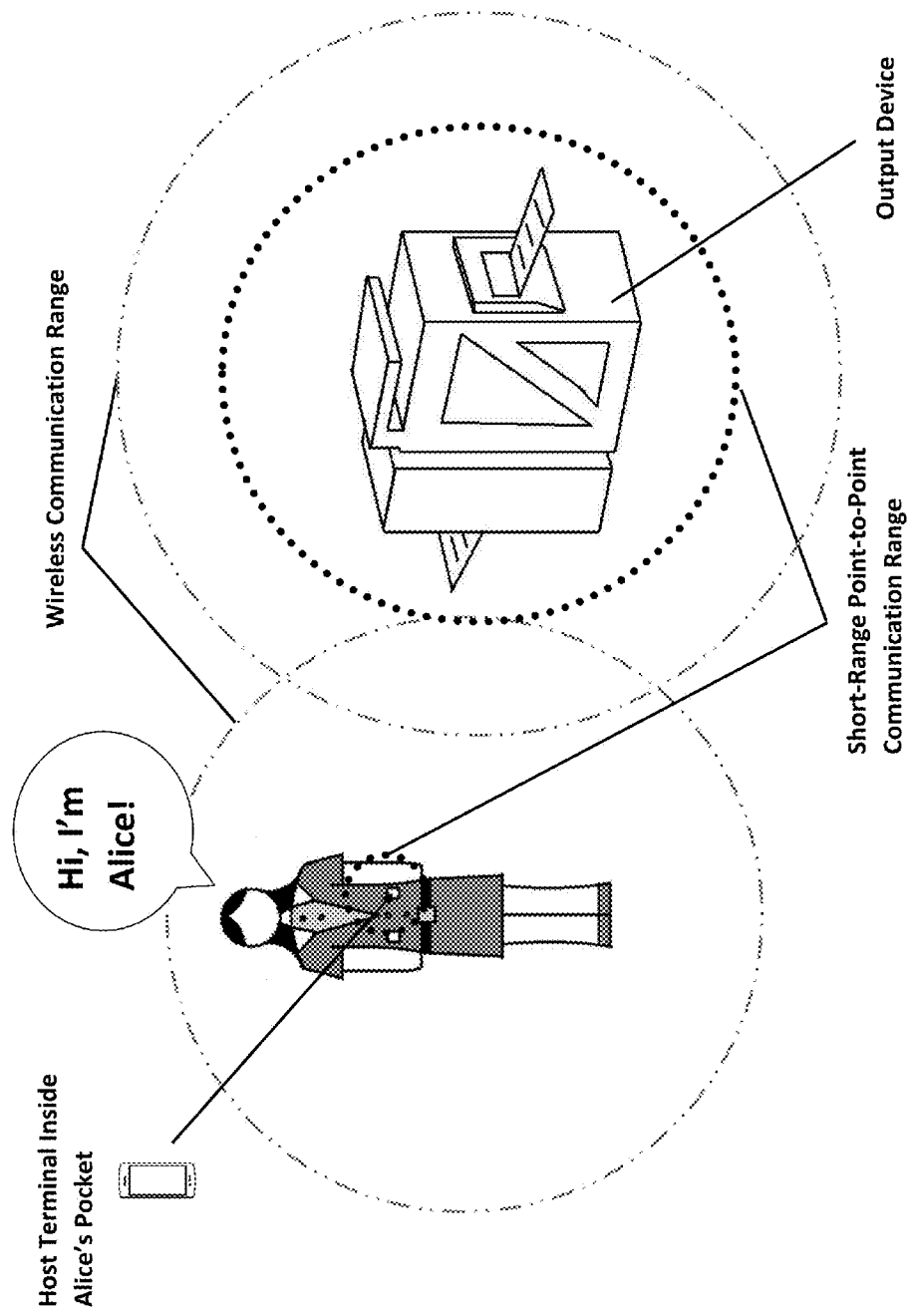
Figure 8C:
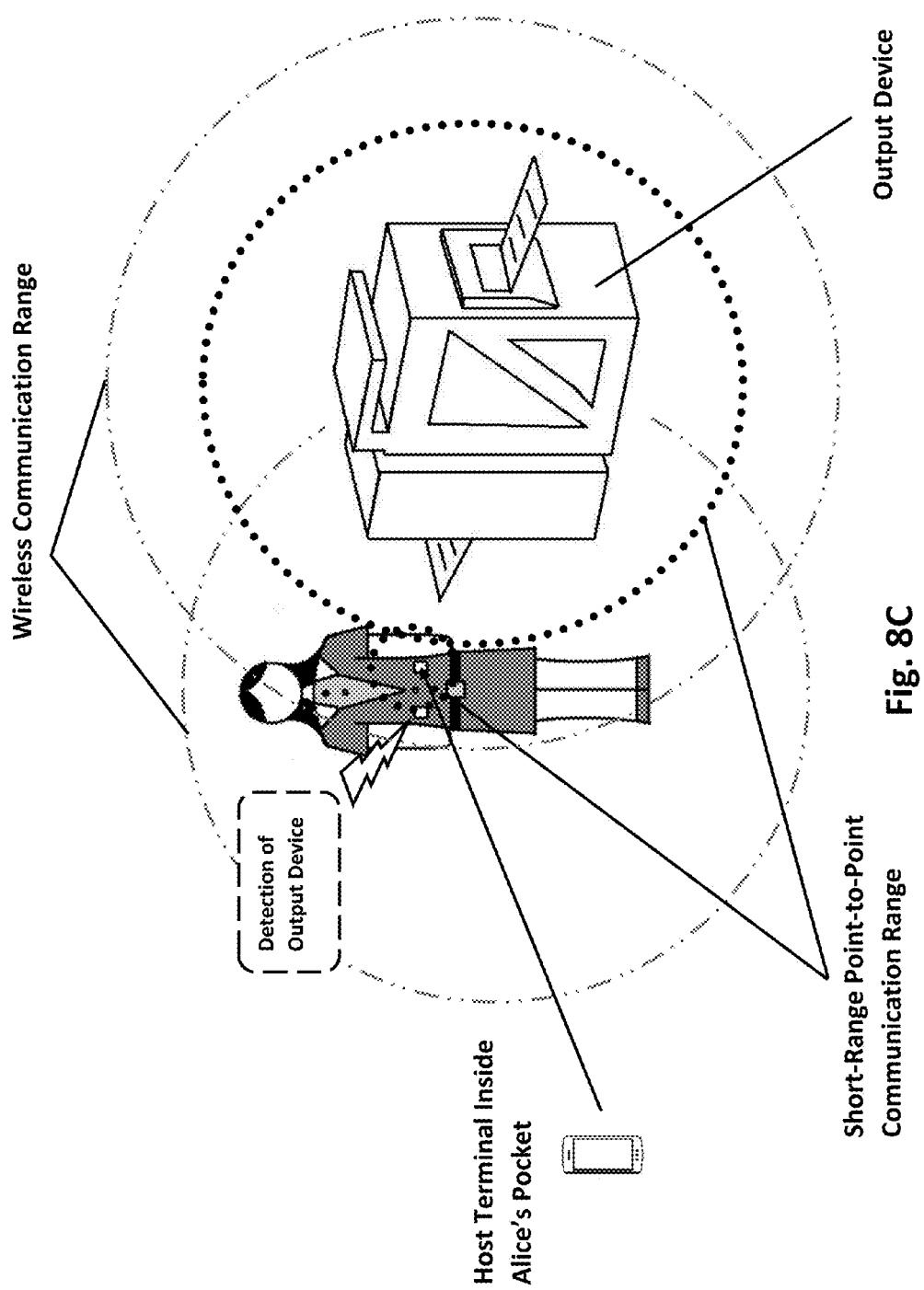
Figure 8D:
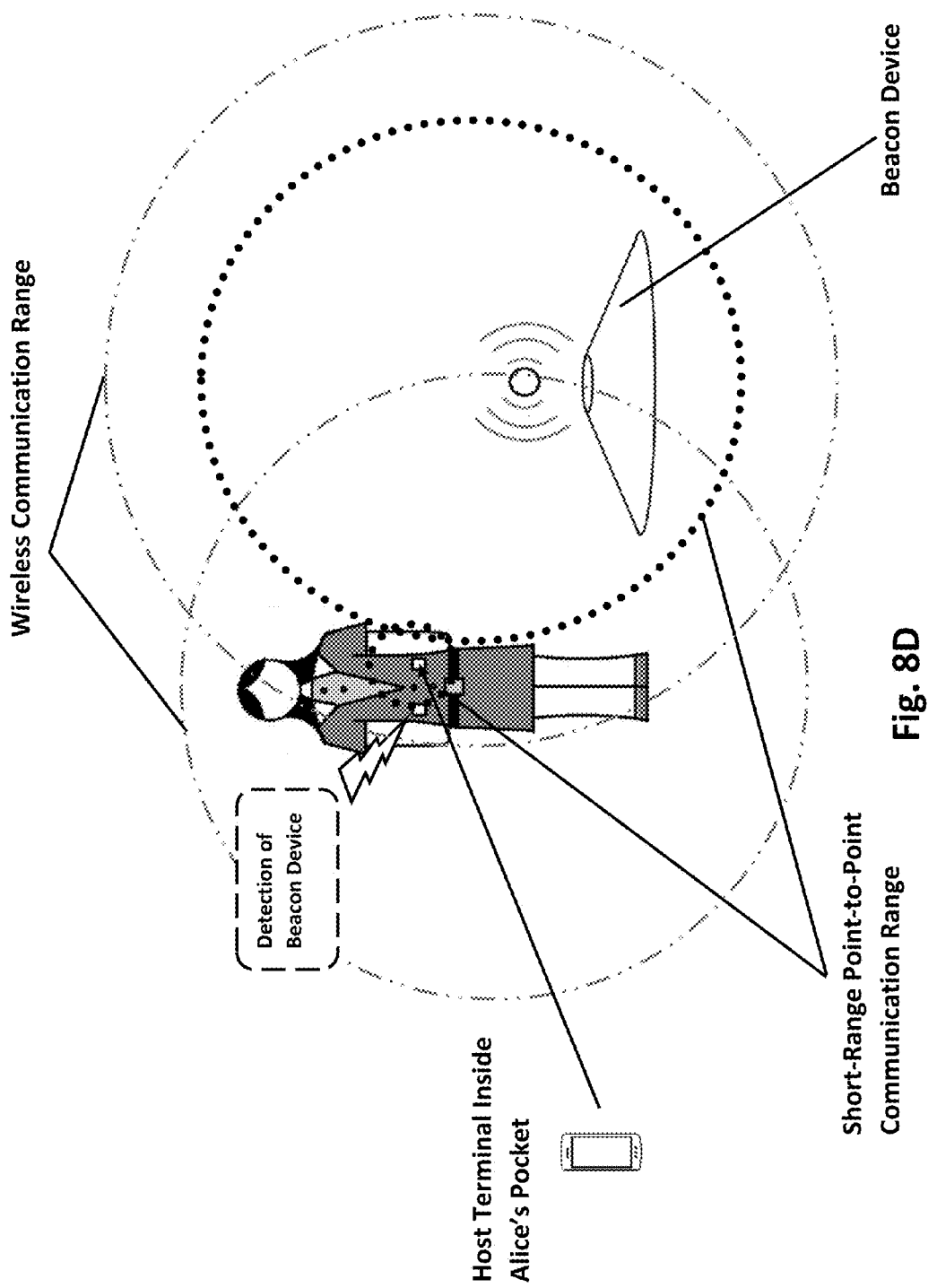

For example, although a host terminal may be within a normal wireless communication range of an output device, such as shown in FIG. 8B, the host terminal does not detect the output device since the device is not within the short-range point-to-point communication range of the host terminal. Once the user moves closer to the output device to a point in which the output device is within the short-range point-to-point communication range of the host terminal, the host terminal can then detect the output device, such as shown in FIG. 8C. The detection process can be performed automatically, and the host terminal can be anywhere in, for example, the user's pocket, hands, etc., and does not require manual operation by the user. After the host terminal has detected the output device, each device may perform communications with each other (e.g., device recognition). In one exemplary embodiment, the short-range point-to-point communication range may be Bluetooth ranges which allows automatic pairing when the detection regions overlap. Likewise, when the host terminal moves close to a beacon device to a point in which the beacon device is within the short-range point-to-point communication range of the host terminal, such as shown in FIG. 8D, each device may perform communications with each other (e.g., device recognition).

Figure 9A:
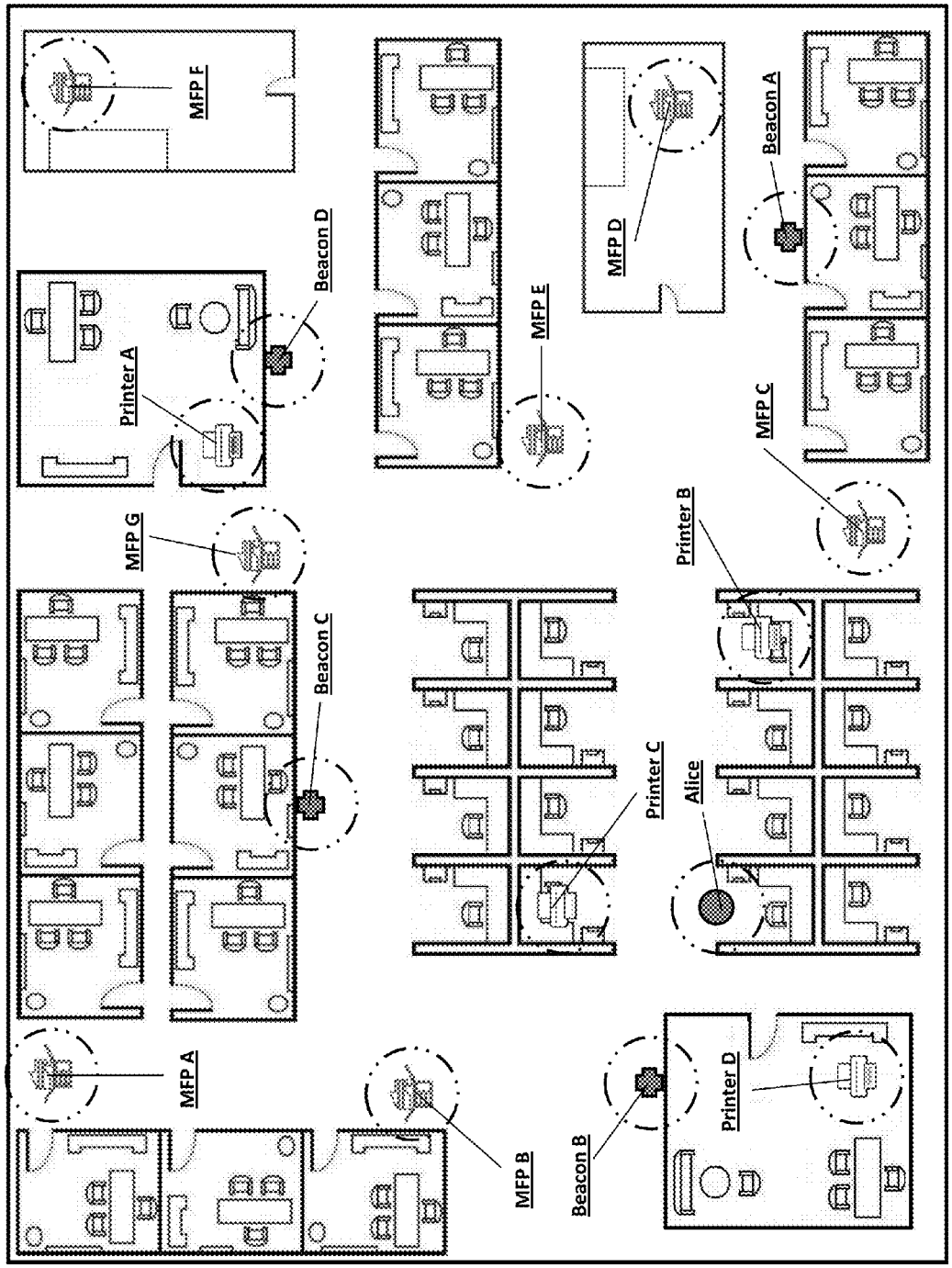
FIGS. 9A-9I show graphical examples of a path taken by a user bearing a terminal.
Figure 9B:
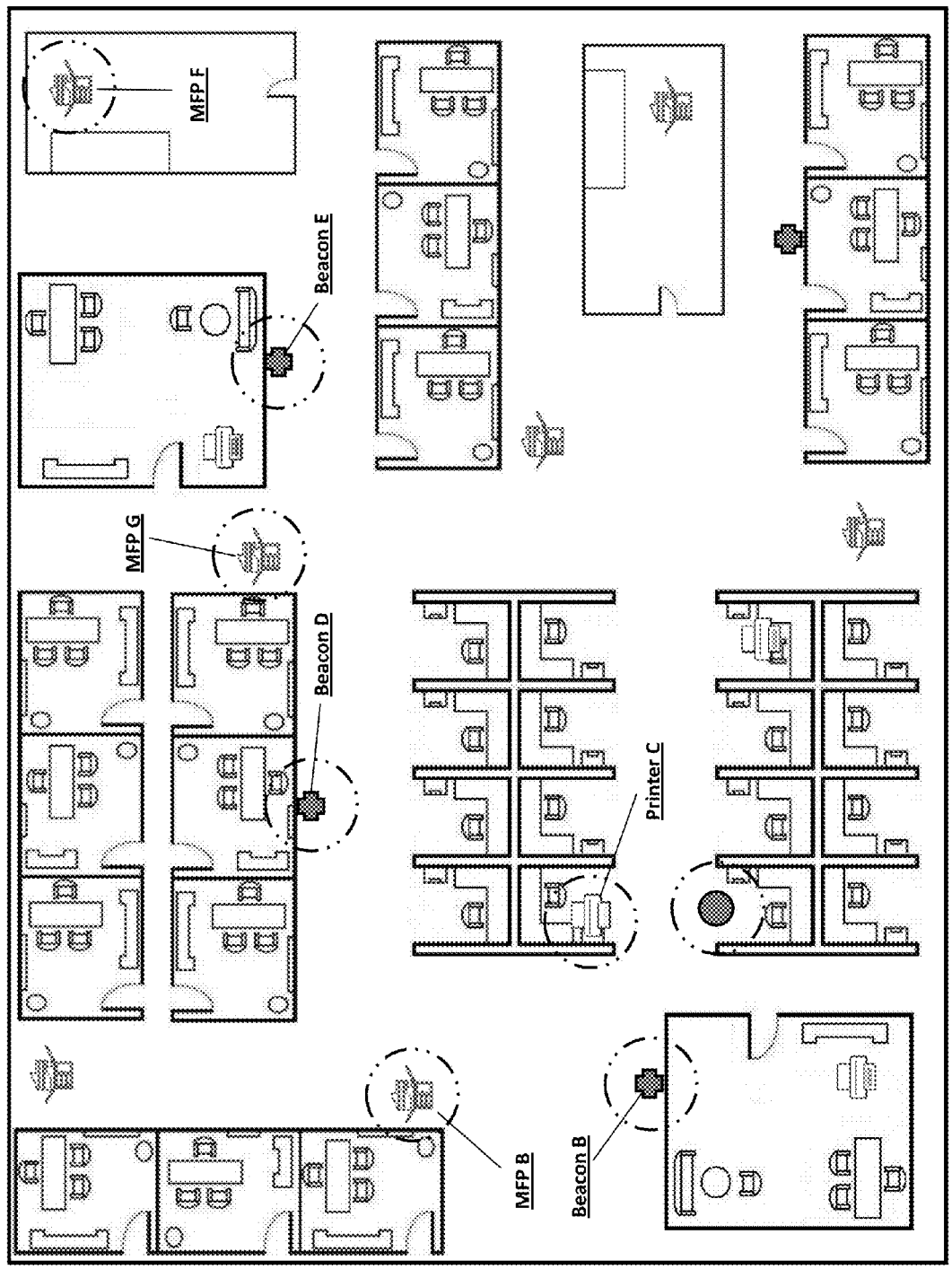

In the exemplary scenario illustrated in FIGS. 9A-9I, the user may work in an office that includes various types of output devices and beacon devices. In the example shown in FIG. 9A, MFPs A-G, beacon devices A-D and printers A-D are configured to perform short-range point-to-point communication (as indicted by the hollow dotted-line circles surrounding each of the devices). Since the user does not have any output device in her cubicle that allows her to print the advertisement, she must utilize an output device disposed somewhere in her office. When the user gets up from her chair and begins walking, the path tracking application detects such movement after a predetermined stationary period of time (step S700), such as shown in FIG. 9B. Next, the tracking application generates a path identifier which may be a series of letters and numbers to identify the new path taken by the user (step S701). As the user is going towards the output device that she wants to utilize, the path tracking application may detect various other devices (e.g., output device, beacon device, etc.) along the way. When the user passes a device at a distance that allows short-range point-to-point communication to be performed, the path tracking application detects and performs short-range communication with such device (step S702).

After performing short-range communication with the detected device, the path tracking application may request a device identifier of the detected device (step S703). Such device identifier may determine the identity of the device as well as the location that the detected device is assigned to. Next, the path tracking application may also determine the amount of time spent at the device as well as obtain a timestamp of the exact time that the device was detected (step S704). Further, the path tracking application may also measure the maximum signal strength (e.g., in dB) of the short-range communication with the detected device (step S705). The maximum signal strength is determined by the distance that the host terminal is from the detected device. For example, the farther away that the host terminal is from the device, the weaker the signal strength is. In contrast, the closer that the host terminal is to the device, the stronger the signal strength is. Once the maximum signal strength has been measured, the path tracking application calculates the present position of the user based on (i) the measured maximum signal strength between the detected device and the host terminal and (ii) the location of the device (step S706). After determining the present position of the user, the path tracking application registers a marker point to record that the user was at a certain location in the office.

Figure 9C:
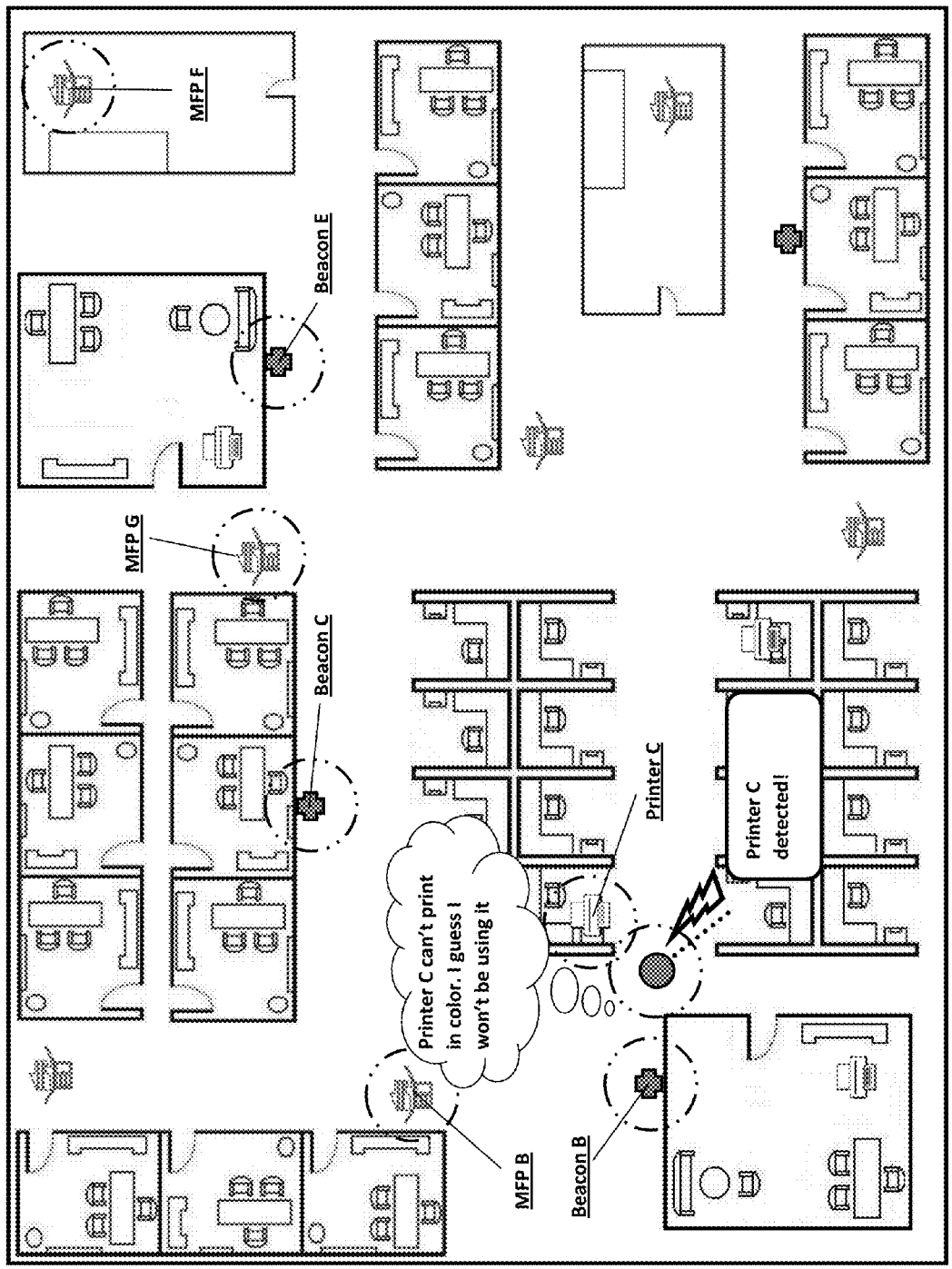

In this case, the first output device that is detected by the path tracking application is the printer C, which is located in a cubicle opposite from the cubicle of the user, such as shown in FIG. 9C. When the path tracking application is within short-range communication range of the printer C, the path tracking application immediately detects the printer C and performs the aforementioned process (e.g., obtaining device identifier, measuring maximum signal strength, calculating present position, etc.). However, the user knows that printer C does not print in color and therefore passes by it.

Figure 9D:
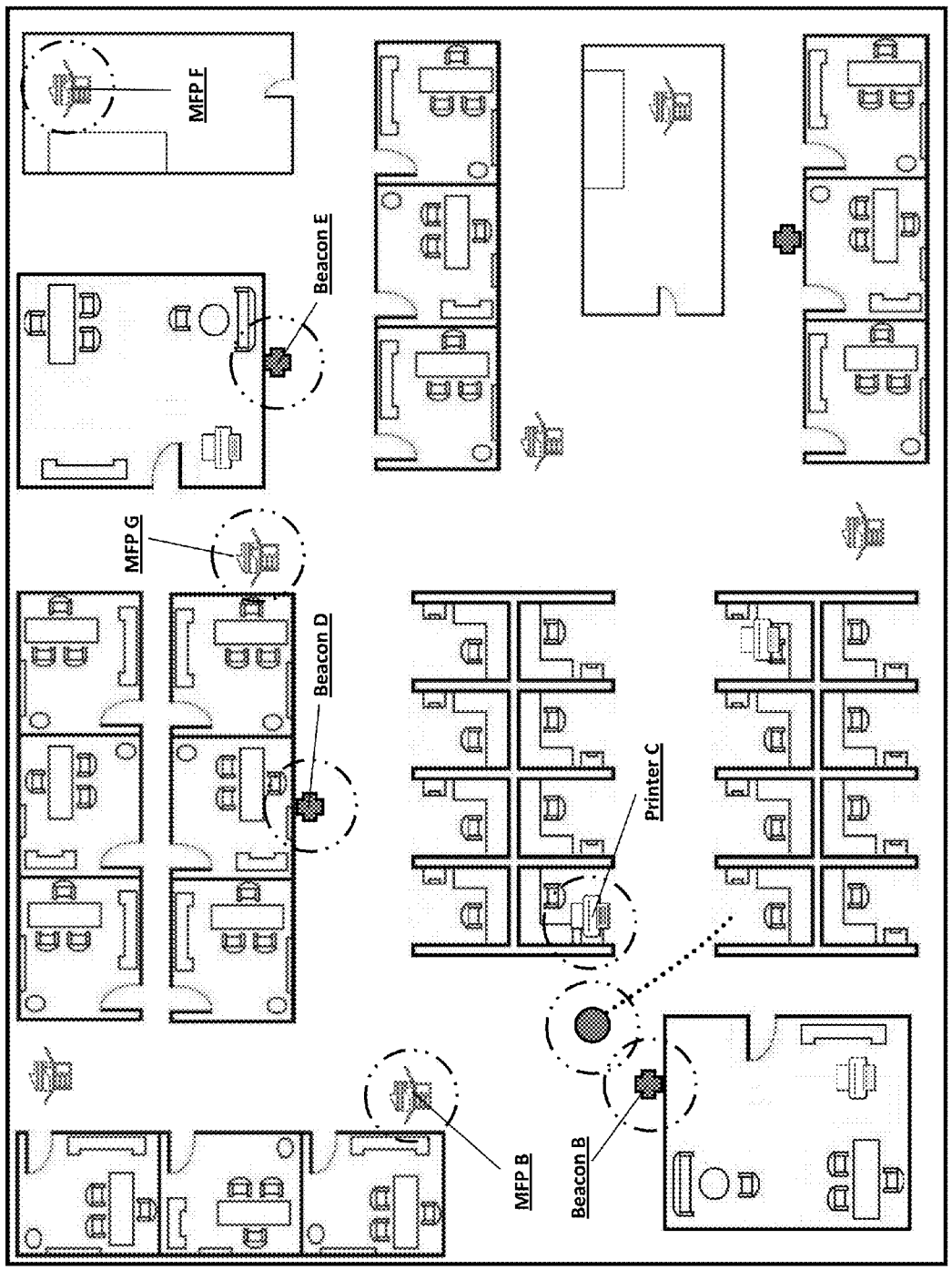

After bypassing printer C, the user passes by a beacon device B at a distance at which the path tracking application can perform short-range communication with the beacon device B, such as shown in FIG. 9D. Since the beacon device B may be hidden or has no capabilities that are required by the user, the user ignores the beacon device B and moves on. The path tracking application still performs the aforementioned process (e.g., obtaining device identifier, measuring maximum signal strength, calculating present position, etc.) with the beacon device B. As the path tracking application detects more devices, the application calculates more positions which the user passed, creates and registers marker points corresponding to such positions, and proceeds to generate a path (such as indicated by the dotted line in FIG. 9D).

Figure 9E:
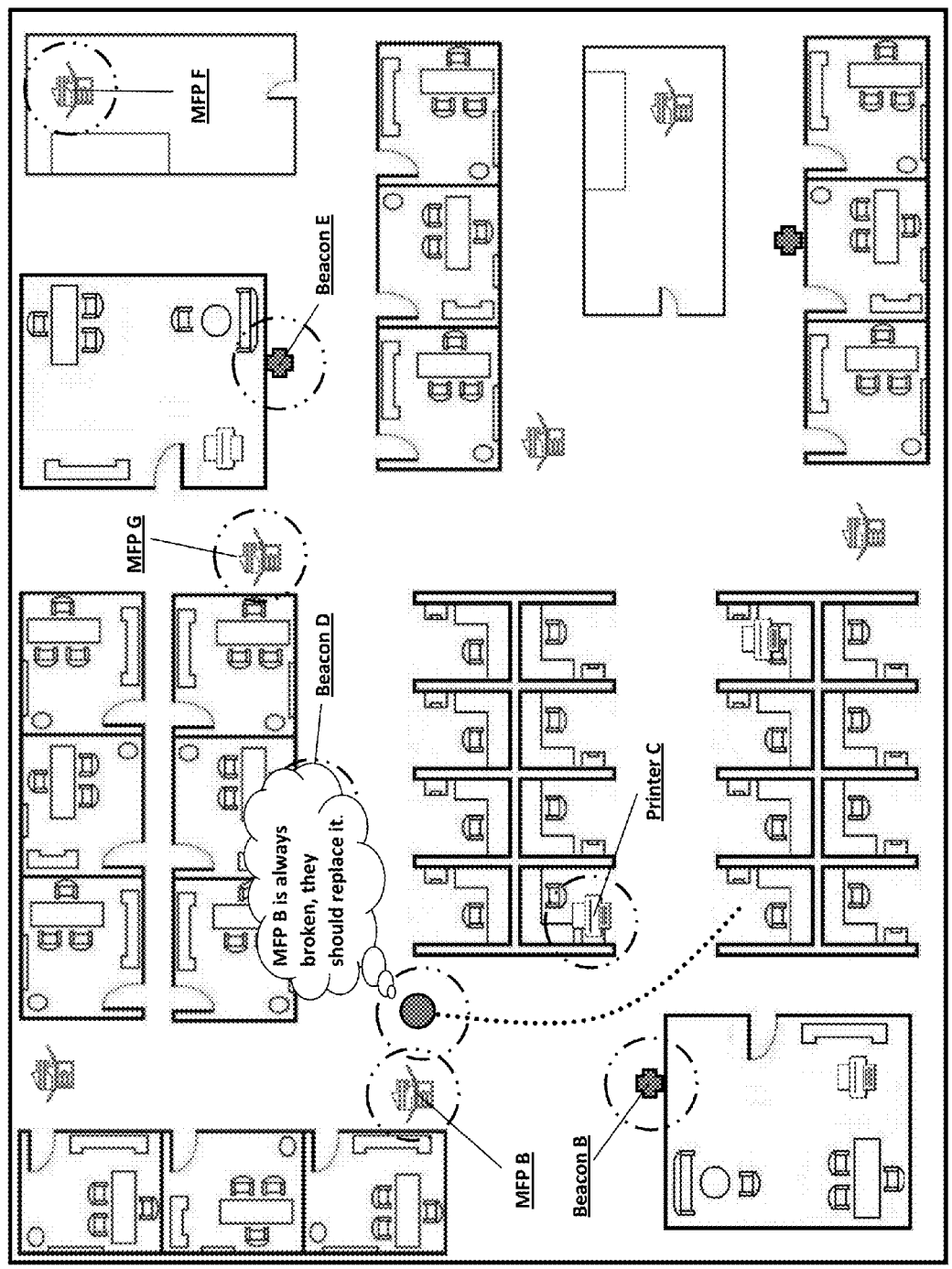
Figure 9F:
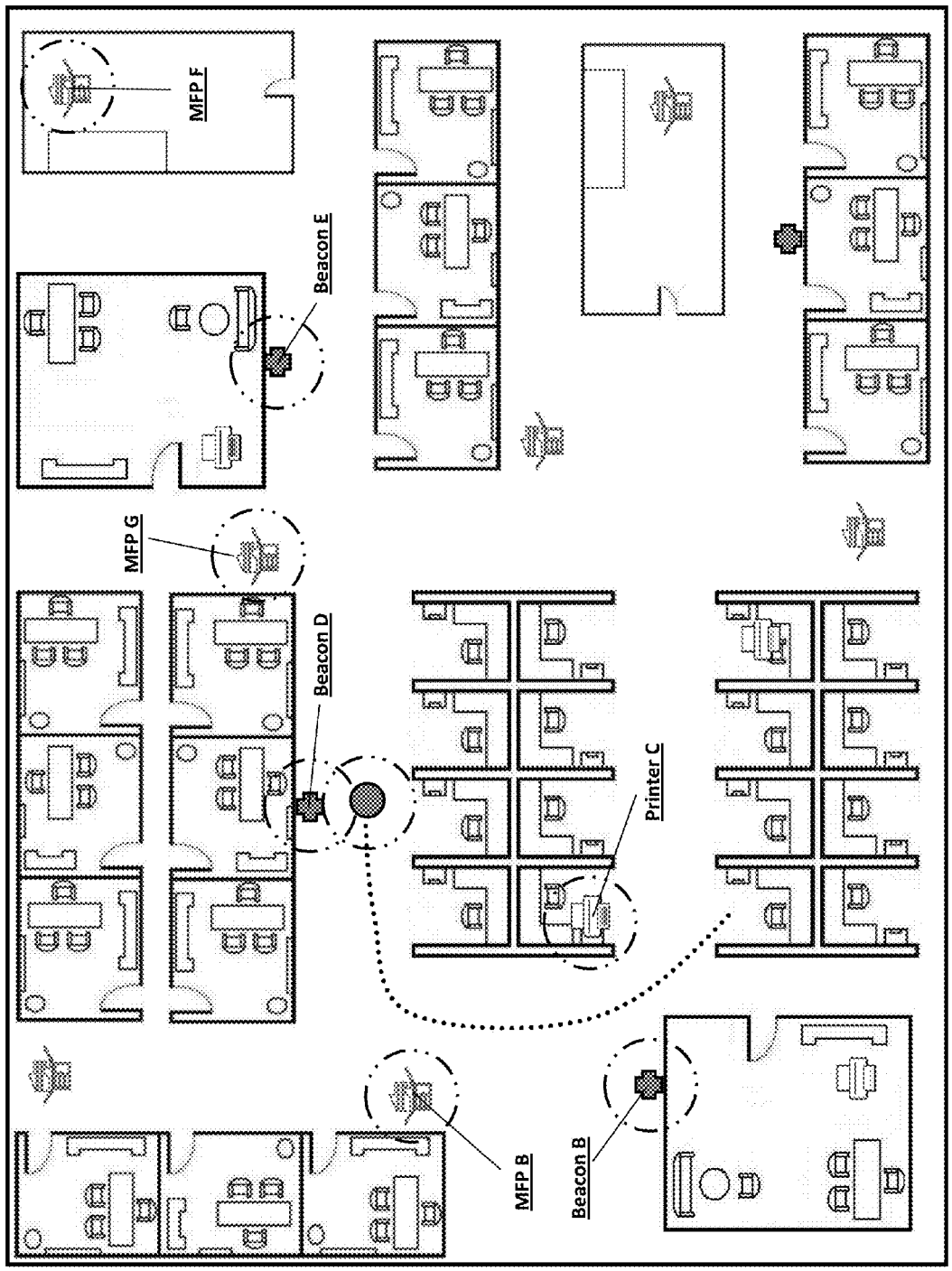
Figure 9G:
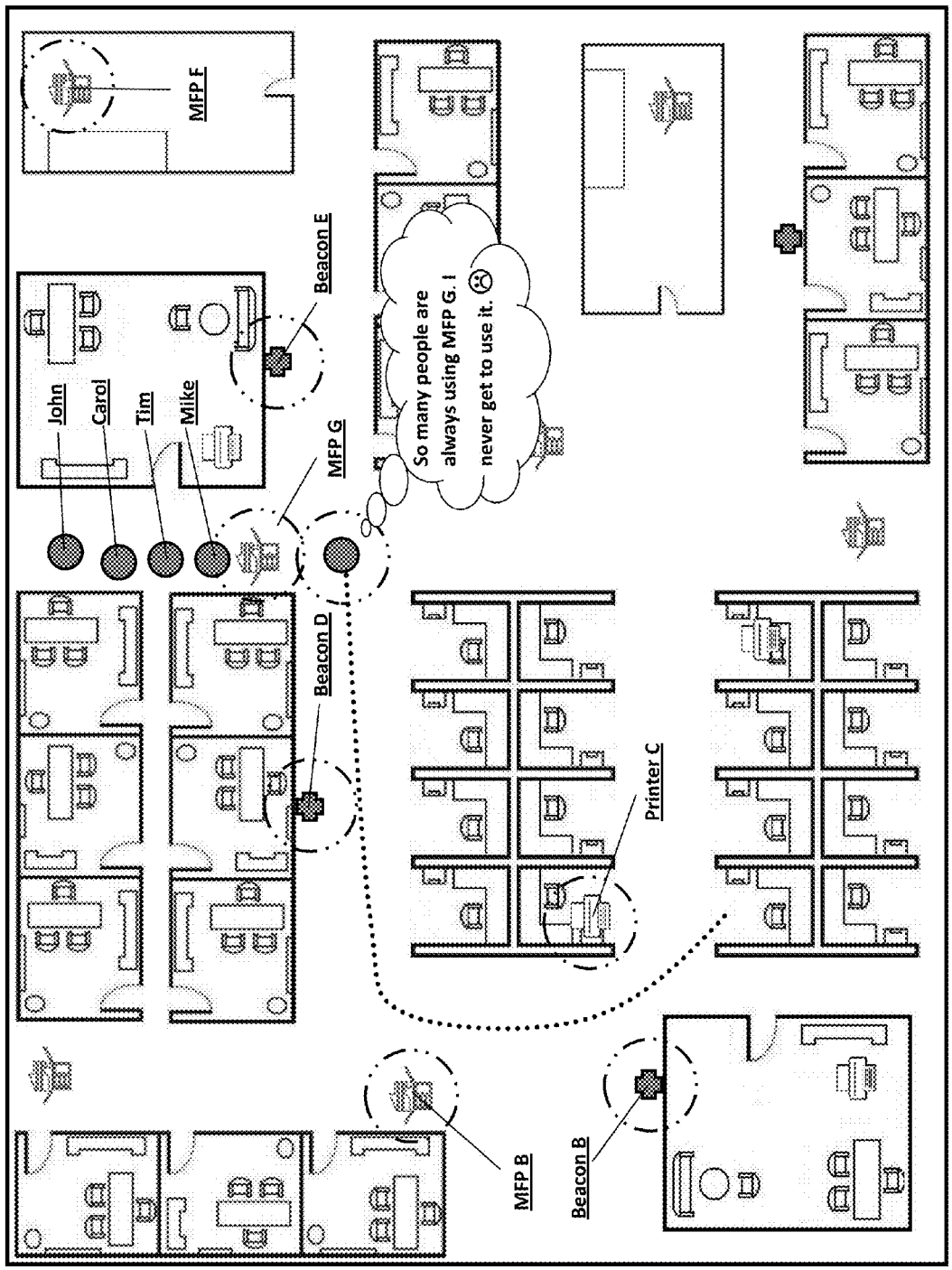
Figure 9H:
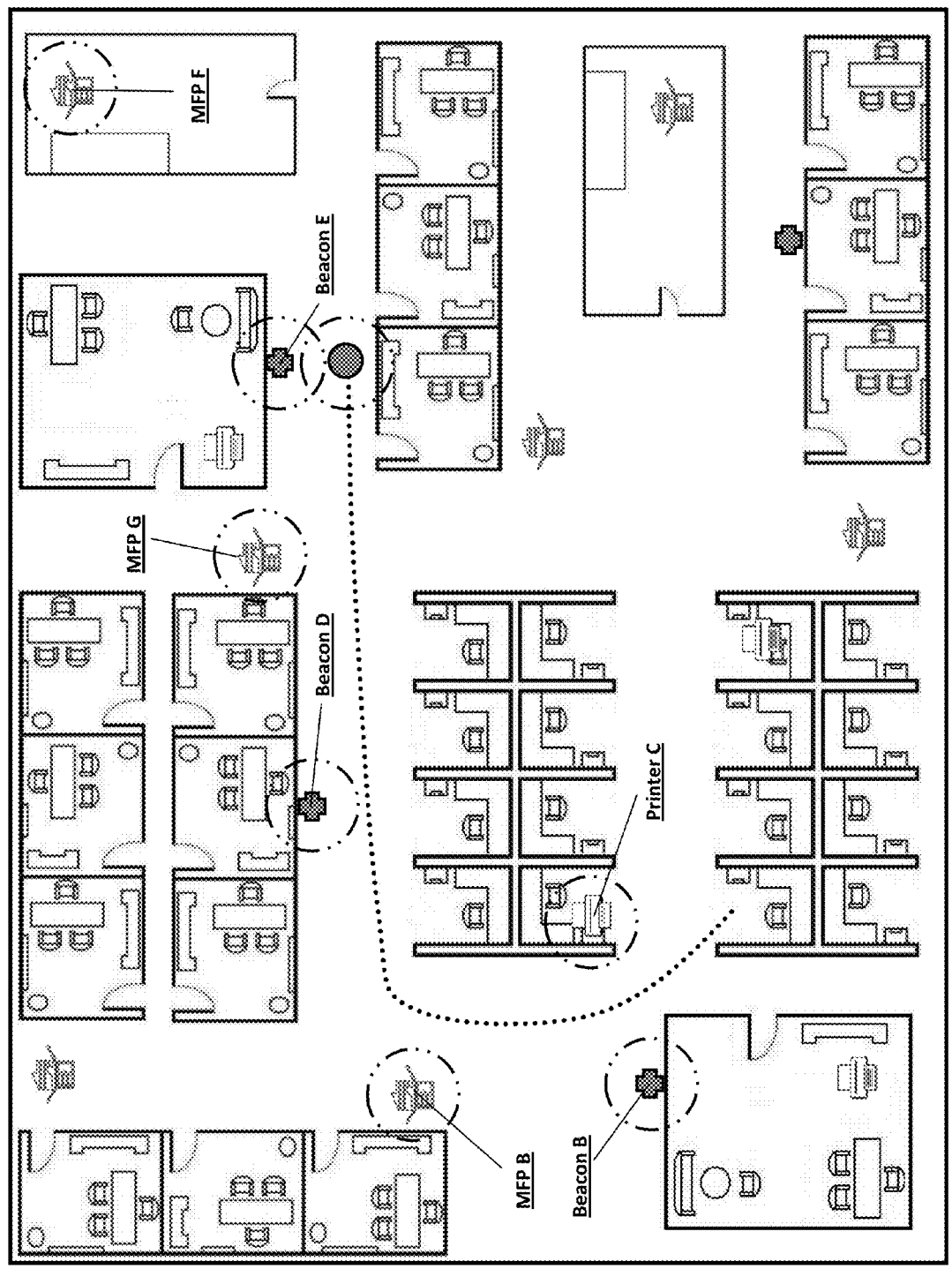
Figure 9I:
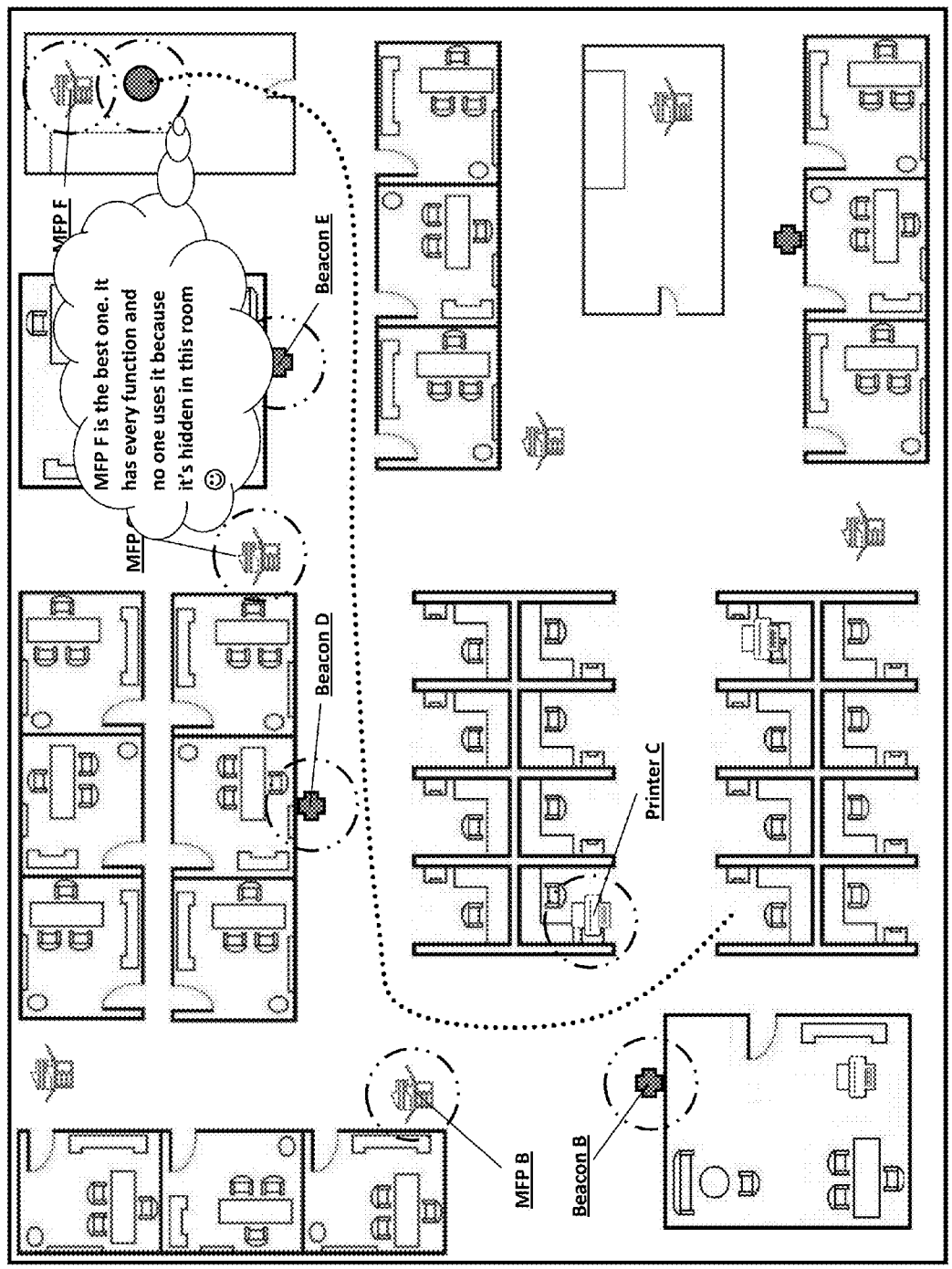

Next, the user may pass by an MFP B, such as shown in FIG. 9E. In this case, the user has selected not to use the MFP B because she is aware that the MFP B always has a service problem (e.g., broken, out of ink, out of paper, etc.). Afterwards, the user bypasses another beacon device D, such as shown in FIG. 9F. Then, the user passes by another MFP G, such as shown in FIG. 9G. In this case, the MFP G may have the capabilities to perform the print job of the user. However, there are many people (e.g., John, Carol, Tim, Mike, etc.) using the MFP G. Due to the long wait lines, the user may not want to utilize the MFP G. Thus, she may want to find another output device instead. In her search, the user may come across yet another beacon device (E), such as shown in FIG. 9H. After encountering beacon device E, the user may finally arrive at her destination, such as shown in FIG. 9I.

Thus, the path tracking application determines if there are any more device detected (step S707). In the case that there are more devices detected (step S707, yes), the process (S702-S706) is repeated for another detected device. Otherwise (step S707, no), the path tracking application determines whether the host terminal has been inactive for a predetermined period of time (step S708). After the user has stopped moving, such lack of action may indicate that she is at the endpoint of her destination. To check whether or not this is true, the path tracking application may start a timer from the moment that the user has stopped moving. In the case that the timer does not pass the predetermined inactive period of time, that is, the user has started moving again (and is not at the endpoint of her path) (step S708, no), the path tracking application goes back to determining whether any more device have been detected. Otherwise (step S708, yes), the path tracking application generates (i) a path from the market points previously created and (ii) a path detail record (step S709).

In this case, the user arrives at the MFP F which is located in a hidden room. After determining that the user is at the endpoint of her path, the path tracking application may also determine that there is an output device (i.e. MFP F) that is at such endpoint. In such scenario, the activities (e.g., scanning, copying, printing, faxing, etc.) performed by the user are recorded into the path detail record. After the path detail record has been completed, the path tracking application may upload such path detail record to the device management server.

Figure 10:
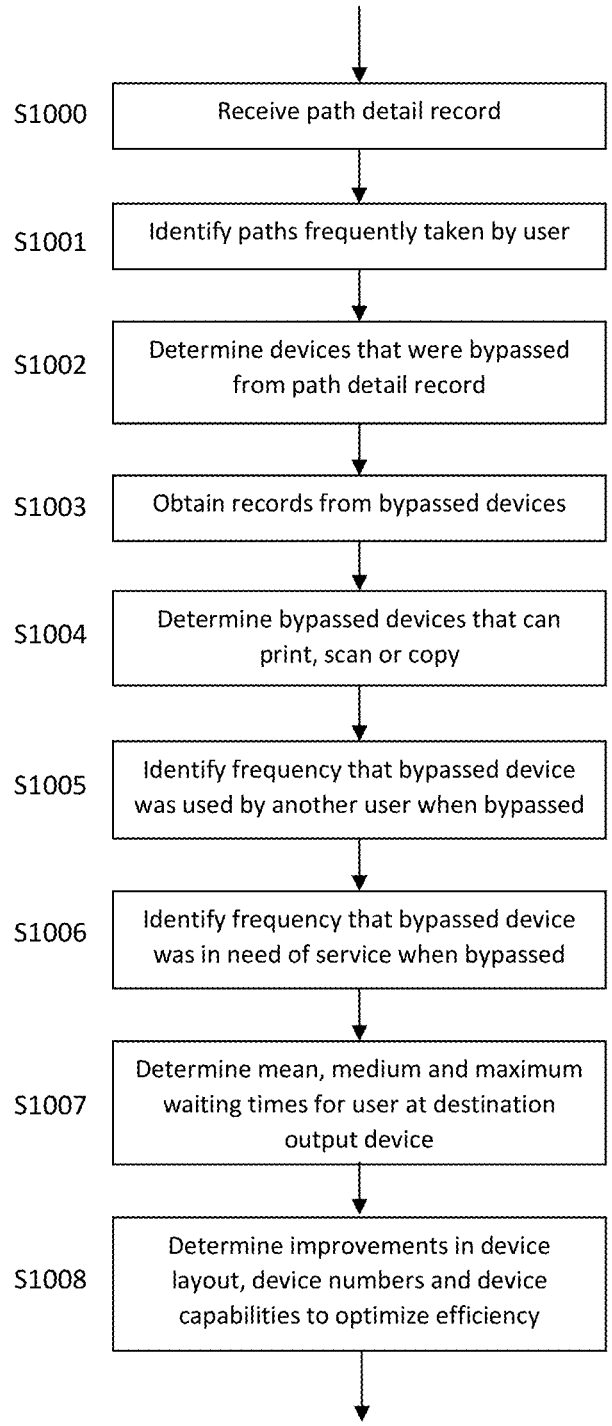
FIG. 10 shows a flow chart of a method that can be performed in the system shown in FIG. 1 (or an equivalent)

FIG. 10 shows a method that can be performed by or with a device management server (e.g., 104), according to an exemplary embodiment.

Whenever a device management server receives (e.g., on demand, on a regular schedule, or randomly, etc.) a path detail record from a host terminal (e.g., 101) (step S1000), the device management server registers the path detail record and corresponding user information (i.e. information identifying the path detail record in connection with the user of the host terminal) into a path detail records database (e.g., 105) and a user information database (e.g., 106), respectively. Next, the device management server performs analysis on the registered path detail record in conjunction (i.e. combination) with other path detail records obtained from other users. In an exemplary embodiment, every time that a new path detail record is received from a host terminal, the device management server performs an analysis using information (e.g., data) in path detail records registered in the path detail records database (including the received new path detail record).

After registering the path detail record, the device management server generates a path analysis by performing one or more determinations. The device management server may first identify the paths frequently taken by the user (step S1001). Thus, in this case, the user of the host terminal may have taken many paths (e.g., walking towards a printer, going to the bathroom, running towards a meeting, etc.) throughout his or her time at a particular location. Thus, the device management server may identify the paths that are most frequented by the user. Next, the device management server may determine devices that have been bypassed by the user on his or her path (step S1002). The device management server may determine such devices for each path taken by the user (i.e. corresponding to each path detail record). On the way to the user's destination (i.e. endpoint) for a particular path, there may be devices (e.g., output devices, beacon devices) that are passed by. They may be passed by since the user is not intending to use them (i.e. output devices) or cannot use them (i.e. beacon devices).

After identifying the bypassed devices, the device management server communicates with each bypassed device to obtain information (e.g., records, data, logs, etc.) associated with such bypassed device (step S1003). For example, the information may include operations that were performed at the bypassed device when the timestamp corresponding to the path detail record was taken. Other information may include the average length of time for an operation to be performed on the bypassed device, the number of users at the output device per day and/or properties of the output device. After obtaining such information from each of the bypassed devices, the device management server may then determine which of the bypassed device can print, scan and/or copy (step S1004). The device management server, by using the information obtained from the bypassed devices, the operations (e.g., print, scan, copy, fax, etc.) that each bypassed device can perform.

Next, the device management server identifies how often that the bypassed device was used by another user when bypassed by the user (step S1005). For example, when the user passes by a device, it may be possible that such device is currently being used by someone else. This can be determine by identifying the timestamp taken when the host terminal is in short-range communication range of the detected device and determining if the device was in use during the time corresponding to that timestamp. Similarly, by applying such determination, the device management server may also identify how often that a bypassed device was in need of service (e.g., broken, out of ink, paper jam, etc.) when bypassed (step S1006). In addition, the device management server may also determine mean, medium and maximum waiting times for user at an output device (step S1007). The user may be at the output device that he or she is intending to use. However, there may be many other users standing in line in front of the user. Thus, the device management server may determine the amount of time taken from the point the user is waiting at the output device to the point that the user is actually using the output device.

After gathering information by performing the aforementioned process, the device management server may propose one or more improvements to a number, capabilities and locations of output devices for the purpose of reducing travel time or average waiting time or to optimize capital expenditure and operating costs (step S1008). The placement of the output devices, the properties of the output devices, and the travel time taken to reach such output devices may not be the most efficient in the office. This determination is made by the numerous path detail records received from both the user and other users (e.g., other employees).

Figure 11:
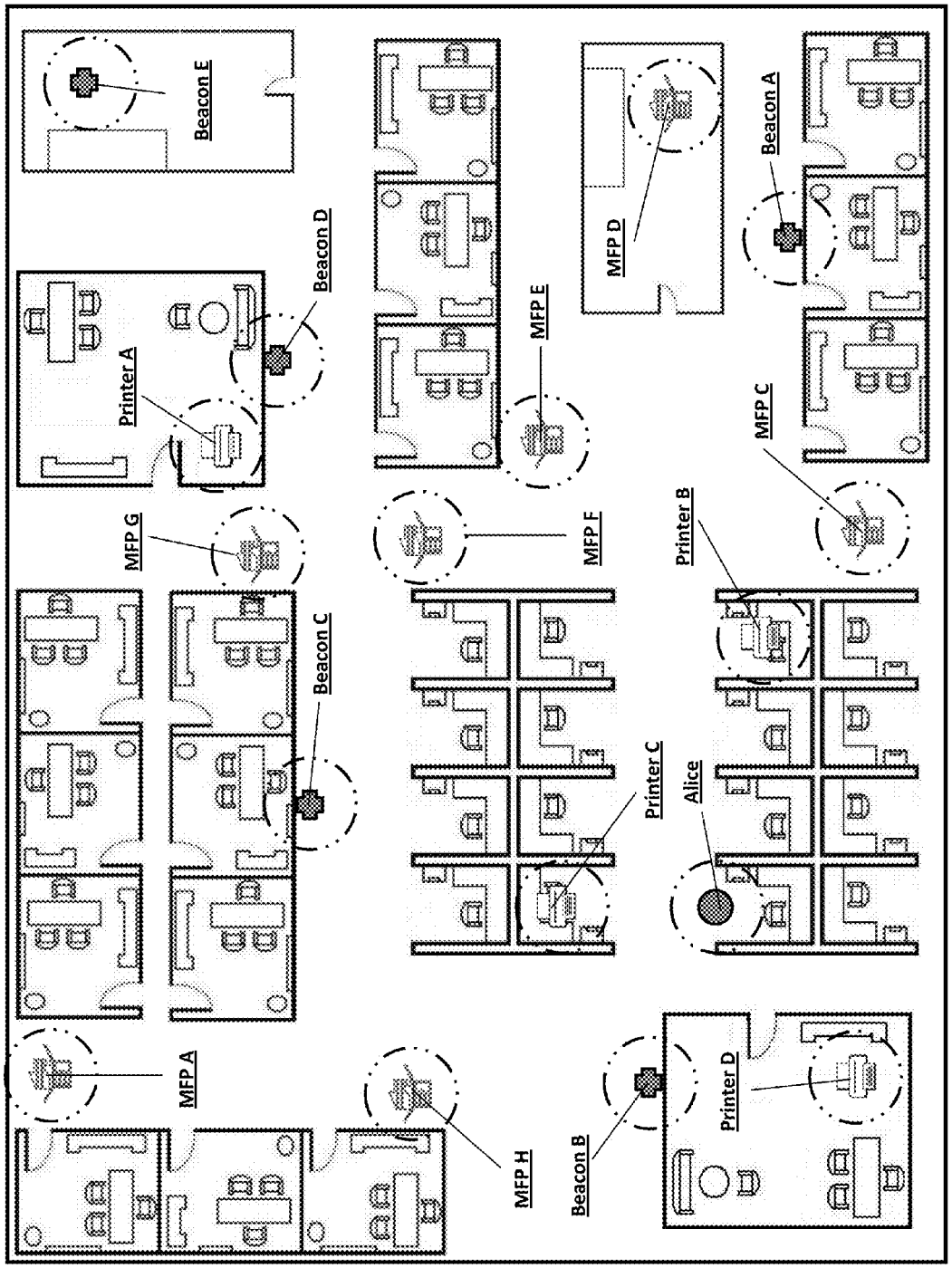
FIG. 11 shows a graphical example of an improved device layout which can be generated based on the method of FIG. 10.

For example, the device management server may have determine that many other users have similar paths and issues as the user. In the example shown in FIG. 9E, MFP B often has a service problem and there are many people on line waiting for to use the MFP G, as shown in FIG. 9G. In addition, few use the MFP F (since it is hidden in a room, as shown in FIG. 9I). Thus, the device management server may determine all of these issues and make improvements on device placement and layout to maximize efficiency in the work place. In an exemplary embodiment, the device management server may send such improvement recommendations to an IT administrator. Such improvement is shown in FIG. 11. In such improvement, MFP B (which has frequently service problems) has been replaced by a new MFP H (which is designed to have less service problems). Further, MFP F has been moved to a location that is near the MFP G for the purpose of (i) alleviating the MFP G from numerous users, (ii) allowing more users to access the MFP F and (iii) reduce travel time to reach the MFP F. In addition, a new beacon E has been placed where the MFP F formerly was to compensate for the removal of the MFP F.

The aforementioned specific embodiments are illustrative, and many variations can be introduced on these embodiments without departing from the spirit of the disclosure or from the scope of the appended claims. In addition, elements and/or features of different examples and illustrative embodiments may be combined with each other and/or substituted for each other within the scope of this disclosure and appended claims.

For example, the orders in which the steps are performed in the aforementioned methods are not limited to those shown in the examples of FIGS. 7 and 10, and may be switched as long as similar results are achieved. Also, the methods illustrated in the examples of FIGS. 7 and 10 may be implemented using any of the systems described in connection with FIG. 1.

What is claimed is:

1. A path tracking application configured to track a path taken by a host terminal, by communicating with output devices and beacon devices along the path, the host terminal including provisions to provide position information regarding then-current position of the host terminal and date-and-time provisions to provide time information regarding then-current date and time at the host terminal, the path tracking application including one or more programs of instructions embodied in a non-transitory computer readable medium and executable by a processor of the host terminal to configure the host terminal to comprise:
  a network communication module to communicate through a network interface of the host terminal via a network with a device management server that manages plural output devices and beacon devices;
  a short-range communication module to communicate by short-range point-to-point communication with a device having provisions to conduct short-range point-to-point communication, when the device is within a short-range communication range threshold;
  a path determination module to determine that the host terminal has been stationary for at least a predetermined stationary period of time, detect movement of the host terminal after said at least the predetermined stationary period of time, and commence recordation, in persistent local storage of the host terminal, of a path detail record corresponding to a new path navigated by the host terminal upon detection of movement of the host terminal after said at least the predetermined stationary period of time, the path detail record including a path identifier, and for each short-range communication session during navigation of and in association with the new path with any output device or beacon device amongst the plural managed output devices and beacon devices, device identifier of the output device or beacon device, date and time at the host terminal when the short-range communication session commenced, time spent within short-range communication range of the output device or beacon device during the short-range communication session, maximum signal strength of the short-range communication during the short-range communication session, and then-current position of the host terminal corresponding to the maximum signal strength.

2. The path tracking application as claimed in claim 1, wherein the provisions of the host terminal to provide position information include an accelerometer, and based on information received from the accelerometer, the path determination module determines that the host terminal is stationary and detects movement of the host terminal, and based on the information from the accelerometer and the time information from the date-and-time provisions, the path determination module determines that the host terminal has been stationary for at least the predetermined stationary period of time.

3. The path tracking application as claimed in claim 1, wherein the path determination module determines that the host terminal is at an end of the new path when the path determination module determines that, after recordation of the path detail record commences, the host terminal has been stationary for a predetermined inactive period of time.

4. The path tracking application as claimed in claim 3, wherein the path determination module records the position information of the host terminal at said end of the new path as an endpoint of the new path, and in an instance that the short-range communication module remains in short-range communication with a paired output device when the path determination module determines said end of the new path, the path determination module records the paired device in association with the endpoint.

5. The path tracking application as claimed in claim 3, wherein the path determination module records the position information of the host terminal at said end of the new path as an endpoint of the new path, and in an instance that the host terminal is communicating via short-range communication with a paired output device when the path determination module determines said end of the new path, to request one or more operations by the paired output device, the path determination module records the paired device and the operations in association with the endpoint.

6. The path tracking application as claimed in claim 1, wherein each time the path tracking application connects to the device management server, the path tracking application uploads path detail records, if any, stored in the persistent local storage of the host terminal, to the device management server.

7. A device management system configured to track a path taken by a terminal, the system comprising:
  a device management server that manages plural output devices and beacon devices; and
  one or more host terminals, each host terminal hosting a path tracking application configured to track a path taken by the host terminal, by communicating with other devices along the path, the host terminal including provisions to provide position information regarding then-current position of the host terminal and date-and-time provisions to provide time information regarding then-current date and time at the host terminal, the path tracking application including one or more programs of instructions embodied in a non-transitory computer readable medium and executable by a processor of the host terminal to configure the host terminal to comprise:

a network communication module to communicate through a network interface of the host terminal via a network with a device management server that manages plural output devices and beacon devices;

a short-range communication module to communicate by short-range point-to-point communication with a device having provisions to conduct short-range point-to-point communication, when the device is within a short-range communication range threshold;

a path determination module to determine that the host terminal has been stationary for at least a predetermined stationary period of time, detect movement of the host terminal after said at least the predetermined stationary period of time, and commence recordation, in persistent local storage of the host terminal, of a path detail record corresponding to a new path navigated by the host terminal upon detection of movement of the host terminal after said at least the predetermined stationary period of time, the path detail record including a path identifier, and for each short-range communication session during navigation of and in association with the new path with any output device or beacon device amongst the plural managed output devices and beacon devices, device identifier of the output device or beacon device, date and time at the host terminal when the short-range communication session commenced, time spent within short-range communication range of the output device or beacon device during the short-range communication session, maximum signal strength of the short-range communication during the short-range communication session, and then-current position of the host terminal corresponding to the maximum signal strength, wherein when the path tracking application connects to the device management server, the path tracking application uploads the path detail record stored in the persistent local storage of the host terminal, to the device management server.

8. The device management system as claimed in claim 7, wherein when the path tracking application hosted by the host terminal connects to the device management server, the path tracking application uploads the path detail record along with user information identifying a user of the path tracking application hosted by the host terminal, to the device management server, and wherein the device management server maintains a database of the information received from the host terminals, including path detail records and associated user information.

9. The device management system as claimed in claim 8, wherein the device management server determines, based on a registered path detail record, that the user associated with the registered path detail record waited at an output device associated with an endpoint of a path recorded in the registered path detail record, and the device management server retrieves an activity log of the output device and determines a reason for waiting by the user at the output device.

10. The device management system as claimed in claim 8, wherein the device management server determines for each user amongst one or more registered users and based on the information registered in the database, a set of paths commonly taken by the user.

11. The device management system as claimed in claim 8, wherein the device management server determines, amongst the managed output devices and based on the information registered in the database, one or more bypassed devices that were bypassed by one or more users when printing, copying or scanning.

12. The device management system as claimed in claim 11, wherein the device management server determines, based on the information registered in the database, how often a device amongst the bypassed devices was being used by another user when the device was bypassed.

13. The device management system as claimed in claim 11, wherein the device management server determines, based on the information registered in the database, how often a device amongst the bypassed devices was in need of service when the device was bypassed.

14. The device management system as claimed in claim 11, wherein the device management server determines whether one or more of the bypassed devices had a required functionality for said printing, copying or scanning.

15. The device management system as claimed in claim 7, wherein the device management server determines, based on the information registered in the database, mean, median and maximum waiting times for users at a destination output device.

16. The device management system as claimed in claim 7, wherein the device management server determines, based on the information registered in the database, how often a beacon device contributes to the path details records.

17. A method performed by a device management system configured to track a path taken by a terminal, the device management system including one or more host terminals and a device management server that manages plural output devices and beacon devices, each host terminal including provisions to provide position information regarding then-current position of the host terminal, date-and-time provisions to provide time information regarding then-current date and time at the host terminal, network communication provisions to communicate through a network interface of the host terminal via a network with the device management server and short-range communication provisions to communicate by short-range point-to-point communication with a device having provisions to conduct short-range point-to-point communication, when the device is within a short-range communication range threshold, the method comprising:

receiving a path detail record, by the device management server via a network from a host terminal hosting a path tracking application that tracks a path taken by the host terminal, by determining that the host terminal has been stationary for at least a predetermined stationary period of time, detecting movement of the host terminal after said at least the predetermined stationary period of time, and recording the path detail record corresponding to a new path navigated by the host terminal upon detection of movement of the host terminal after said at least the predetermined stationary period of time, the path detail record including a path identifier, and for each short-range communication session during navigation of and in association with the new path with any output device or beacon device amongst the plural managed output devices and beacon devices, device identifier of the output device or beacon device, date and time at the host terminal when the short-range communication session commenced, time spent within short-range communication range of the output device or beacon device during the short-range communication session, maximum signal strength of the short-range communication during the short-range communication session, and then-current position of the host terminal corresponding to the maximum signal strength; and maintaining by a device management server in the device management system a database of the information received from the host terminals, including path detail records and associated user information.

18. The method as claimed in claim 17, wherein when the path tracking application hosted by the host terminal connects to the device management server, the path tracking application uploads the path detail record along with user information identifying a user of the path tracking application hosted by the host terminal, to the device management server.

19. The method as claimed in claim 18, further comprising:

(a) performing by the device management server, based on the information registered in the database, one or more determinations amongst the following:

determining for each user amongst one or more registered users a set of paths commonly taken by the user;

determining amongst the managed output devices one or more bypassed devices that were bypassed by one or more users when printing, copying or scanning;

determining how often a device amongst the bypassed devices was being used by another user when the device was bypassed;

determining how often a device amongst the bypassed devices was in need of service when the device was bypassed;

determining whether one or more of the bypassed devices had a required functionality for said printing, copying or scanning;

determining mean, median and maximum waiting times for users at a destination output device; and (b) determining by the device management server based on the determinations in (a), and proposing, one or more improvements to a number, capabilities and locations of managed output devices in the system, to reduce travel time or average waiting time or to optimize capital expenditure and operating costs.

* * * * *